United States Patent
Dohi et al.

(10) Patent No.: US 12,278,545 B2
(45) Date of Patent: Apr. 15, 2025

(54) ELECTRIC MOTOR WITH REVERSE INPUT CUTOFF CLUTCH

(71) Applicant: NSK LTD., Tokyo (JP)

(72) Inventors: Nagao Dohi, Fujisawa (JP); Yuya Daikoku, Fujisawa (JP); Eiji Inoue, Fujisawa (JP)

(73) Assignee: NSK LTD., Tokyo (JP)

( * ) Notice: Subject to any disclaimer, the term of this patent is extended or adjusted under 35 U.S.C. 154(b) by 271 days.

(21) Appl. No.: 17/997,977

(22) PCT Filed: Jan. 25, 2022

(86) PCT No.: PCT/JP2022/002565
§ 371 (c)(1),
(2) Date: Nov. 4, 2022

(87) PCT Pub. No.: WO2022/163617
PCT Pub. Date: Aug. 4, 2022

(65) Prior Publication Data
US 2023/0179063 A1   Jun. 8, 2023

(30) Foreign Application Priority Data

Jan. 28, 2021   (JP) .................. 2021-012278

(51) Int. Cl.
*H02K 7/108* (2006.01)
*F16D 43/02* (2006.01)
(Continued)

(52) U.S. Cl.
CPC ............. *H02K 7/108* (2013.01); *F16D 43/02* (2013.01); *F16D 51/12* (2013.01); *F16D 65/22* (2013.01);
(Continued)

(58) Field of Classification Search
None
See application file for complete search history.

(56) References Cited

U.S. PATENT DOCUMENTS 2,031,186 A    2/1936  Still
11,339,839 B2 *  5/2022  Toyoda ................. F16D 41/105
(Continued)

FOREIGN PATENT DOCUMENTS

DE    19809407 A1    9/1998
EP    4 008 922 A1   6/2022
(Continued)

OTHER PUBLICATIONS

Japanese Office Action for Japanse Application No. 2022-542472 dated Oct. 25, 2022, 5 pages.
(Continued)

*Primary Examiner* — Bernard Rojas
(74) *Attorney, Agent, or Firm* — Sughrue Mion, PLLC

(57) ABSTRACT

An output shaft is configured by connecting a first shaft and a second shaft, coaxially arranged with each other, by a reverse input cutoff clutch 20; an end portion on one side in an axial direction of the second shaft located on an opposite side from the first shaft with a gear portion sandwiched in between in the axial direction being rotatably supported with respect to a fixed portion by a bearing device; the reverse input cutoff clutch having a function that, when rotational torque is input to the first shaft, transmits the rotational torque input to the first shaft to the second shaft, and when rotational torque is reversely input to the second shaft, completely cuts off the rotational torque reversely input to the second shaft and does not transmit the rotational torque to the first shaft, or transmits part of the rotational torque to the first shaft and cuts off the remaining portion.

9 Claims, 27 Drawing Sheets

(51) Int. Cl.
*F16D 51/12* (2006.01)
*F16D 65/22* (2006.01)
*H02K 7/08* (2006.01)
*F16D 121/14* (2012.01)
*F16D 125/28* (2012.01)
*F16D 127/02* (2012.01)

(52) U.S. Cl.
CPC ......... *H02K 7/083* (2013.01); *F16D 2121/14* (2013.01); *F16D 2125/28* (2013.01); *F16D 2127/02* (2013.01)

(56) References Cited

U.S. PATENT DOCUMENTS

| | | | |
|---|---|---|---|
| 11,506,249 | B2 * | 11/2022 | Dohi .......................... F16D 3/02 |
| 2005/0189189 | A1 * | 9/2005 | Acosta .................... F16D 43/02 |
| | | | 192/223.2 |
| 2006/0175175 | A1 * | 8/2006 | Acosta .................... F16D 41/10 |
| | | | 192/12 R |
| 2012/0098367 | A1 | 4/2012 | Mizutani et al. |
| 2022/0060084 | A1 | 2/2022 | Kishida et al. |

FOREIGN PATENT DOCUMENTS

| | | |
|---|---|---|
| JP | 61-2779 U | 1/1986 |
| JP | 2003-72567 A | 3/2003 |
| JP | 2007-16878 A | 1/2007 |
| JP | 2011-027252 A | 2/2011 |
| JP | 2017-40288 A | 2/2017 |
| JP | WO 2021/054481 A1 | 3/2021 |
| WO | 2020/054763 A1 | 3/2020 |

OTHER PUBLICATIONS

International Search Report for PCT/JP2022/002565 dated Apr. 5, 2022.

European Search Report issued by the European Patent Office in application No. 22745838.7 dated Oct. 26, 2023.

* cited by examiner

FIG. 18A
FIG. 18B
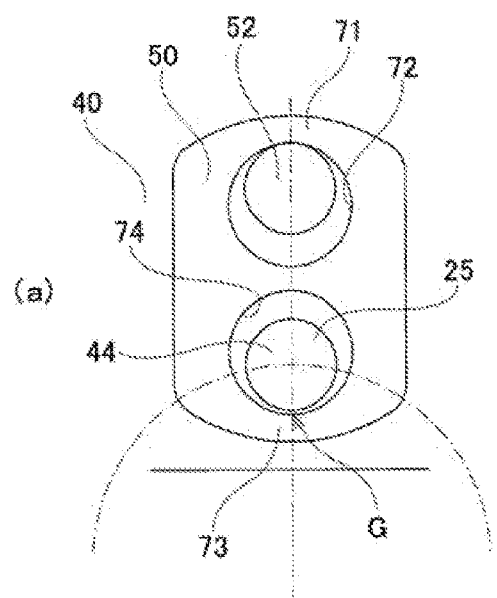
(a)
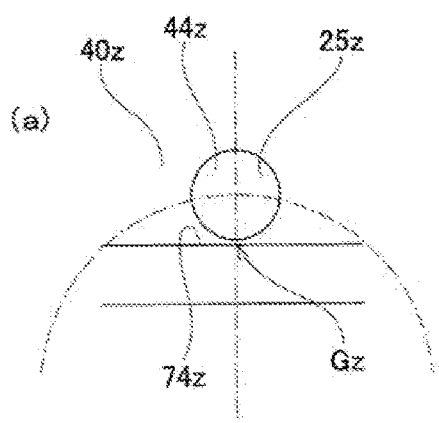
(a)
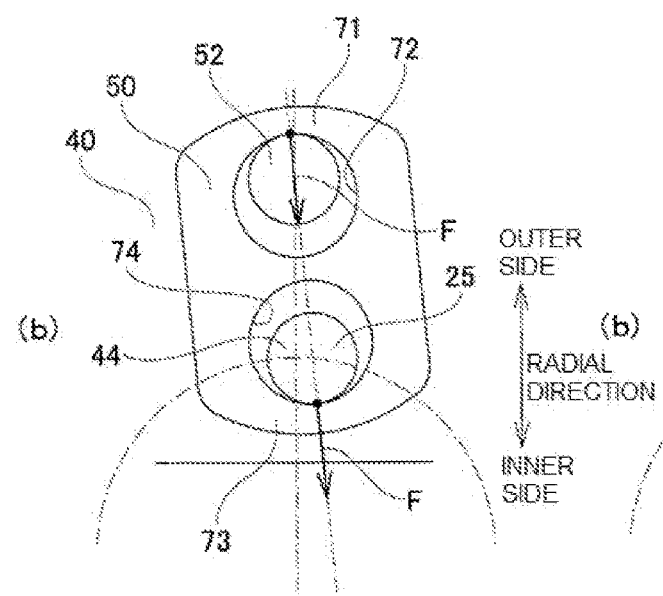
(b)
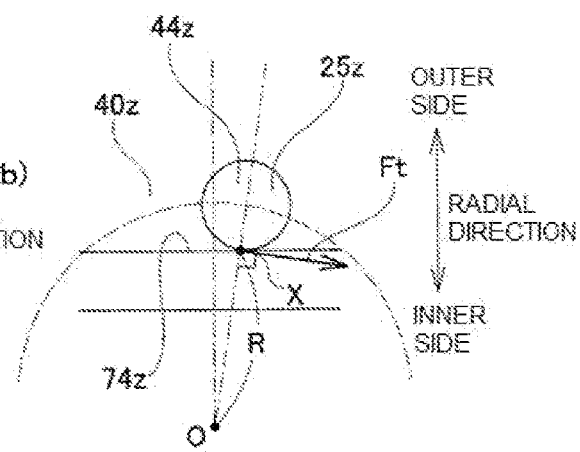
(b)

ELECTRIC MOTOR WITH REVERSE INPUT CUTOFF CLUTCH

CROSS REFERENCE TO RELATED APPLICATIONS

This application is a National Stage of International Application No. PCT/JP2022/002565 filed Jan. 25, 2022, claiming priority based on Japanese Patent Application No. 2021-012278 filed Jan. 28, 2021.

TECHNICAL FIELD

The present invention relates to an electric motor with a reverse input cutoff clutch.

BACKGROUND ART

In electric actuators used in electric doors, electric power windows of automobiles, and the like, an electric motor is used as a drive source, and a displacement member such as a door or a window is displaced based on a rotational force of the electric motor. In this kind of electric actuator, it is necessary to maintain a position of the displacement member regardless of a force acting on the displacement member such as, for example, weight of a window itself. Even when the displacement member is not displaced, as long as the electric motor is energized and exerts a rotational force, it is possible to maintain the position of the displacement member regardless of the force acting on the displacement member. However, this is disadvantageous from the aspect of saving energy. As long as a worm reducer that reduces the rotational force of the electric motor has a self-locking function, it is possible to maintain the position of the displacement member even when the energization of the electric motor is stopped. However, positive efficiency of the electric actuator becomes low, and thus it is necessary to use a large electric motor, which may increase the size of the entire device.

JP 2007-016878 A describes construction of an electric actuator that includes a reverse input cutoff clutch arranged in parallel between an output shaft of the electric motor and a screw shaft. The reverse input cutoff clutch has a function of transmitting torque from the output shaft of the electric motor to the screw shaft, and completely cutting off torque from the screw shaft, and not transmitting torque from the screw shaft to the output shaft. Therefore, in the electric actuator described in JP 2007-016878 A, it is possible to maintain a position of a nut arranged around the screw shaft without energizing the electric motor.

CITED LITERATURE

Patent Literature

[Patent Literature 1] JP 2007-016878 A

SUMMARY OF INVENTION

Technical Problem

However, in the electric actuator described in JP 2007-016878 A, an input member and an output member of the reverse input cutoff clutch are arranged in parallel with the output shaft of the electric motor. Therefore, in addition to a bearing for rotatably supporting the output shaft of the electric motor with respect to a housing, bearings are required to rotatably support each of the input member and output member of the reverse input cutoff clutch. Therefore, there is room for improvement from an aspect of making the electric actuator more compact.

In consideration of circumstances such as described above, an object of the present invention is to achieve construction of an electric motor with a reverse input cutoff clutch that simplifies making the electric motor with a reverse input cutoff clutch more compact.

Solution to Problem

The electric motor with a reverse input cutoff clutch of the present invention includes a motor housing, an output shaft, a bearing device, a rotor, and a stator.

The output shaft includes a first shaft rotatably supported on an inner side of the motor housing; a second shaft having a torque output portion at an intermediate portion in an axial direction and coaxially arranged with the first shaft; and a reverse input cutoff clutch arranged on the inner side of the motor housing and configured to connect the first shaft and the second shaft.

The reverse input cutoff clutch has a function that, in a case where rotational torque is input to the first shaft, transmits the rotational torque that is input to the first shaft to the second shaft, and in a case where rotational torque is reversely input to the second shaft, completely cuts off the rotational torque that is reversely input to the second shaft, or transmits part of the rotational torque that is reversely input to the second shaft to the first shaft and cuts off the remaining portion.

The bearing device is externally fitted to a portion of the second shaft located on an opposite side from the first shaft with the torque output portion sandwiched in the axial direction, and configured to rotatably support the second shaft at a portion that does not rotate even during use.

The rotor is arranged around the first shaft and is configured to rotate integrally with the first shaft.

The stator is arranged around the rotor and is supported by and fixed to an inner side of the motor housing.

In the electric motor with a reverse input cutoff clutch according to an aspect of the present invention, the bearing device can be configured by a four-point contact type or a deep groove type single row radial ball bearing, or a radial rolling bearing such as a double row angular contact ball bearing.

In the electric motor with a reverse input cutoff clutch according to an aspect of the present invention, the reverse input cutoff clutch may include:

a pressed surface;
an input portion that integrally rotates with the first shaft;
an output portion coaxially arranged with the input portion and that integrally rotates with the second shaft; and
an engaging element including a pressing surface that presses against the pressed surface; wherein
the engaging element, in a case where rotational torque is input to the input portion, due to engagement with the input portion, can move in a direction causing the pressing surface to move away from the pressed surface and engages with the output portion, and in a case where rotational torque is reversely input to the output portion, due to engagement with the output portion, can move in a direction causing the pressing surface to move toward the pressed surface, and causing the pressing surface to frictionally engage with the pressed surface.

In the electric motor with a reverse input cutoff clutch according to an aspect of the present invention, the input portion may include an input side engaging portion at a portion separated in a radial direction from a center of rotation thereof, and the output portion may include an output side engaging portion further on an inner side in the radial direction than the input side engaging portion, and the engaging element may include an input side engaged portion capable of engaging with the input side engaging portion and is arranged between the pressed surface and the output side engaging portion.

In the electric motor with a reverse input cutoff clutch according to an aspect of the present invention, the engaging element is configured by two engaging elements arranged so as to sandwich the output side engaging portion by bottom surfaces of the engaging elements.

In the electric motor with a reverse input cutoff clutch according to an aspect of the present invention, the engaging element may include:

an engaging element main body having the pressing surface, an output side engaged portion that engages with the output side engaging portion, and a pivot support portion located closer to the pressing surface than the input side engaged portion in a direction in which the pressing surface moves away from or toward the pressed surface; and a linking member that includes the input side engaged portion and a pivotally supported portion that is pivotally supported by the pivot support portion.

In the electric motor with a reverse input cutoff clutch according to an aspect of the present invention, the engaging element main body may include:

a pair of main body plates including a plate side output engaging portion that constitutes the output side engaged portion, arranged overlapping in the axial direction, and coupled to each other; and a pivot support shaft that constitutes the pivot support portion, the end portions on both sides in the axial direction of the pivot support shaft being supported by the pair of main body plates; and the linking member may be arranged between the pair of main body plates.

The engaging element main body may include an intermediate plate that is sandwiched between the pair of main body plates.

In the electric motor with a reverse input cutoff clutch according to an aspect of the present invention, the input portion may be integrally formed with the first shaft, and the output portion may be integrally formed with the second shaft.

In the electric motor with a reverse input cutoff clutch according to an aspect of the present invention, the motor housing may include the pressed surface on an inner peripheral surface thereof.

In the electric motor with a reverse input cutoff clutch according to an aspect of the present invention, the motor housing may include a drive unit housing portion that houses the rotor and the stator, and a clutch housing portion that houses the reverse input cutoff clutch and has an outer diameter smaller than an outer diameter of the drive unit housing portion; and the clutch housing portion may include the pressed surface on an inner peripheral surface thereof, and may include an inner-diameter side spigot fitting surface with an outer diameter that does not change in the axial direction on an outer peripheral surface thereof.

In the electric motor with a reverse input cutoff clutch according to an aspect of the present invention, one shaft of the first shaft and the second shaft may include a cylindrical shaft concave portion in a central portion of an end surface in the axial direction, and the other shaft of the first shaft and the second shaft may include a shaft convex portion that is inserted into an inner side of the shaft concave portion; and the output shaft may include a radial bearing arranged between an inner peripheral surface of the shaft concave portion and an outer peripheral surface of the shaft convex portion.

In the electric motor with a reverse input cutoff clutch according to an aspect of the present invention, the torque output portion may be configured by a gear portion, a pulley portion, or a sprocket portion.

EFFECTS OF INVENTION

In the electric motor with a reverse input cutoff clutch according to an aspect of the present invention, the output shaft is configured by connecting a first shaft and a second shaft, coaxially arranged with each other, by a reverse input cutoff clutch, and thus, compared with the construction described in JP 2007-016878 A, may be easily made more compact.

Particularly, in the electric motor with a reverse input cutoff clutch according to an aspect of the present invention, a portion of the second shaft located on the opposite side in the axial direction from the first shaft with the torque output portion sandwiched in between is rotatably supported with respect to a portion that does not rotate during use by a bearing device. Therefore, it is easy to keep dimensions in the axial direction of a motor housing that houses a drive unit composed of the rotor and the stator, and the reverse input shutoff clutch short, and from this aspect as well, it is easy to make the electric motor with a reverse input cutoff clutch more compact.

BRIEF DESCRIPTION OF DRAWINGS

FIG. 18A(*a*) is a view illustrating an engaging portion between the engaging element and the input side engaging portion in the first example in a state before rotational torque is input to the first shaft; FIG. 18A(*b*) is a view illustrating a state after rotational torque is input to the first shaft from the state shown in FIG. 18A(*a*); FIG. 18B(*a*) is a view illustrating a comparative example in which the engaging portion between the engaging element and the input side engaging portion is in a state before rotational torque is input to the first shaft; and FIG. 18B(*b*) is a view illustrating a state after rotational torque is input to the first shaft from the state shown in FIG. 18B(*a*).

DESCRIPTION OF THE EMBODIMENTS

First Example

Figure 1:
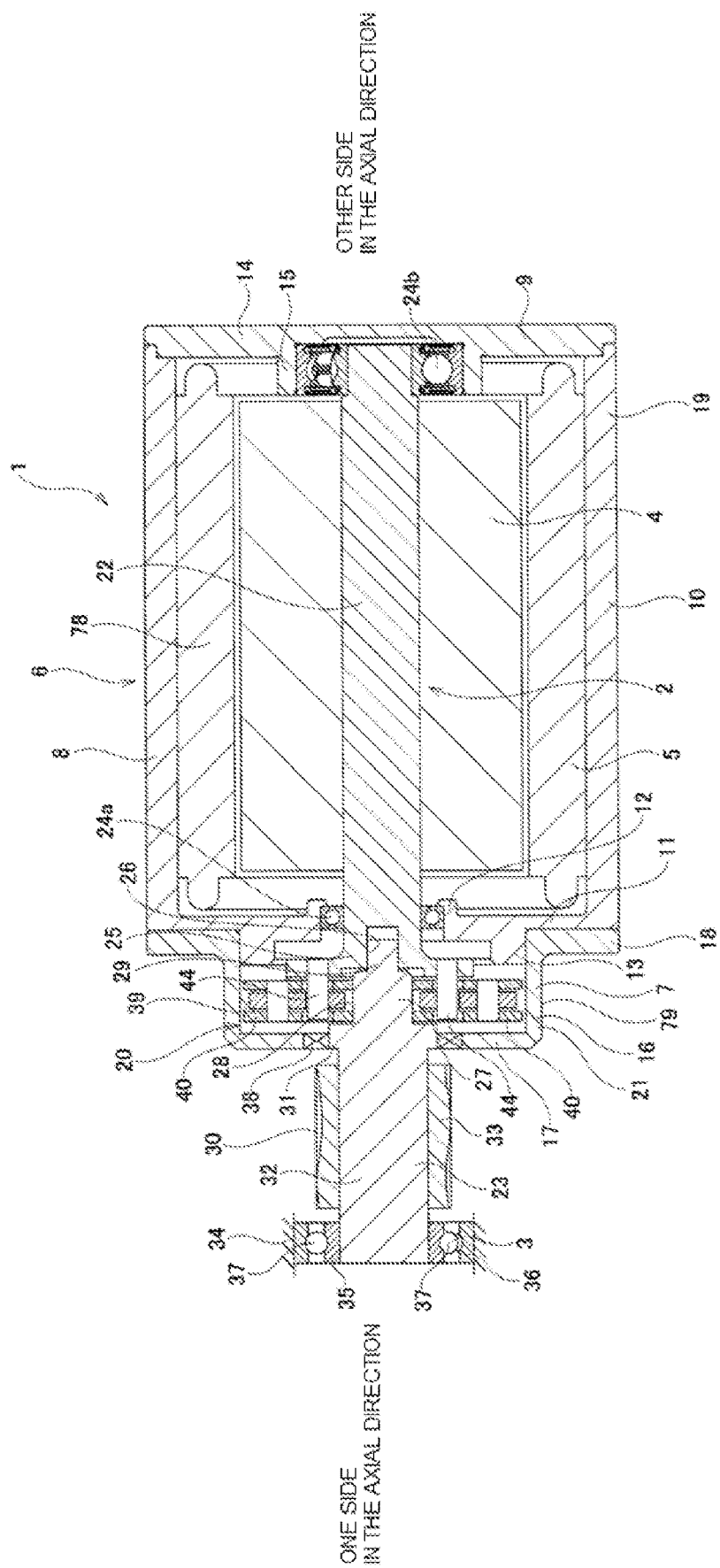
FIG. 1 is a cross-sectional view illustrating an electric motor with a reverse input cutoff clutch according to a first example of an embodiment of the present invention.
Figure 2:
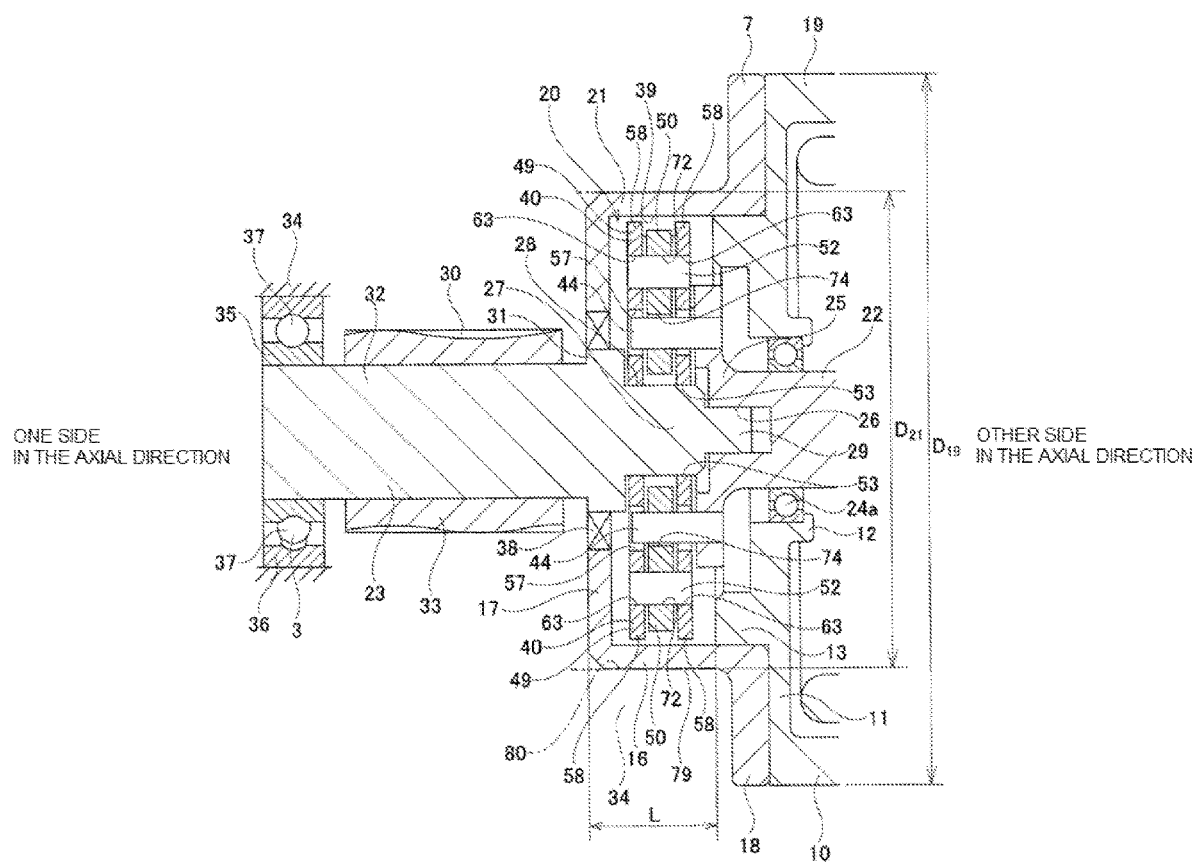
FIG. 2 is an enlarged cross-sectional view of the main part in FIG. 1.

FIG. 1 to FIG. 19B illustrate a first example of an embodiment of the present invention. An electric motor with a reverse input cutoff clutch of this example includes a motor housing 1, an output shaft 2, a bearing device 3, a rotor 4, and a stator 5.

The motor housing 1 includes a drive unit housing portion 19 that houses a drive unit 78 composed of the rotor 4 and the stator 5, and a clutch housing portion 21 that houses a reverse input cutoff clutch 20 described below.

The clutch housing portion 21 has an outer diameter D21 smaller than an outer diameter D19 of the drive unit housing portion 19. The clutch housing portion 21 has a cylindrical concave pressed surface 39 on an inner peripheral surface thereof and a cylindrical convex surface shaped inner-diameter side spigot fitting surface 79 on an outer peripheral surface thereof whose outer diameter does not change in the axial direction.

In this example, the motor housing 1 includes a first housing element 6 and a second housing element 7.

The first housing element 6 includes a main body portion 8 and a cover portion 9.

The main body portion 8 includes a cylindrical portion 10, an annular portion 11 bent inward in a radial direction from an end portion on one side (left side in FIG. 1) in the axial direction of the cylindrical portion 10, a cylindrical holding portion 12 bent toward the other side (right side in FIG. 1) in the axial direction from an end portion on an inner side in the radial direction of the annular portion 11, and a ridge 13 protruding from the entire circumference of an intermediate portion in the radial direction of the annular portion 11 toward the one side in the axial direction.

The cover portion 9 includes a disc-shaped bottom plate portion 14 that covers an opening portion on the other side in the axial direction of the cylindrical portion 10 of the main body portion 8, and a cylindrical holding portion 15 that protrudes from one side surface in the axial direction of the bottom plate portion 14. The cover portion 9 is fixed to an end portion on the other side in the axial direction of the cylindrical portion 10 of the main body portion 8 by a fixing method such as welding or screwing to cover the opening portion on the other side in the axial direction of the cylindrical portion 10.

The second housing element 7 includes a cylindrical portion 16, an inner-diameter side annular portion 17 bent inward in the radial direction from an end portion on the one side in the axial direction of the cylindrical portion 16, and an outer-diameter side annular portion 18 bent outward in the radial direction from an end portion on the other side in the axial direction of the cylindrical portion 16.

In this example, the second housing element 7 is positioned in the radial direction with respect to the first housing element 6 by internally fitting without looseness (by spigot fitting) an outer peripheral surface of the ridge 13 of the first housing element 6 with an inner peripheral surface of the end portion on the other side in the axial direction of the cylindrical portion 16 of the second housing element 7 with no looseness in the radial direction. In a state in which the second housing element 7 is positioned radially with respect to the first housing element 6, the first housing element 6 and the second housing element 7 are coupled to each other by a coupling member such as a bolt to form the motor housing 1.

The motor housing 1 of this example, on an inner side of the first housing element 6, has the drive unit housing portion 19 that houses the drive unit 78, and, on an inner side of the second housing element 7, has the clutch housing portion 21 that houses the reverse input cutoff clutch 20. In other words, the drive unit housing portion 19 is configured by the cylindrical portion 10 and the annular portion 11 of the main body portion 8 of the first housing element 6, and the bottom plate portion 14 of the cover portion 9. The clutch housing portion 21 is configured by the cylindrical portion 16 and the inner-diameter side annular portion 17 of the second housing element 7, and an inner side portion in the radial direction of the annular portion 11 of the main body portion of the first housing element 6.

The motor housing 1 is positioned with respect to a fixed portion 34 by internally fitting without looseness (by spigot fitting) an inner-diameter side spigot fitting surface 79 to a cylindrical concave outer-diameter side spigot fitting surface 80 provided at the fixed portion 34 that does not rotate in use such as a housing other than the motor housing 1. In a state in which the motor housing 1 is positioned with respect to the fixed portion 34, the motor housing 1 is supported by and fixed to the fixed portion 34 using a support member such as bolts. More specifically, for example, bolts are inserted through through-holes that penetrate in the axial direction at a plurality of locations in a circumferential direction through a flange portion protruding outward in the radial direction from an outer peripheral surface of the drive unit housing portion 19 (cylindrical portion 10), and the motor housing 1 is supported by and fixed to the fixed portion 34 by screwing the bolts into a plurality of screw holes provided in the fixed portion 34.

The output shaft 2 includes a first shaft 22 rotatably supported on the inner side of the motor housing 1, a second shaft 23 arranged coaxially with the first shaft 22, and the reverse input cutoff clutch 20 arranged on the inner side of the motor housing 1 and connecting the first shaft 22 and the second shaft 23.

The first shaft 22 is rotatably supported by two bearings 24a, 24b on an inner side of the first housing element 6 of the motor housing 1. Of the two bearings 24a, 24b, the bearing 24a on the one side in the axial direction is arranged between an inner peripheral surface of the cylindrical holding portion 12 of the main body portion 8 and an outer peripheral surface of an intermediate portion in the axial direction of the first shaft 22, and the bearing 24b on the other side in the axial direction is arranged between an inner peripheral surface of a cylindrical holding portion 15 of the cover portion 9 and an outer peripheral surface of an end portion on the other side in the axial direction of the first shaft 22. Note that in the present example, single-row deep groove ball bearings are used as the bearings 24a, 24b.

The first shaft 22 includes an input portion 25 of the reverse input cutoff clutch 20 described below at an end portion on the one side in the axial direction, and more specifically, at a portion located further on the one side in the axial direction than a portion where the bearing 24a on the one side in the axial direction is externally fitted, and includes a cylindrical shaft concave portion 26 (also referred to as a shaft recess portion).

The second shaft 23 includes an output portion 27 of the reverse input cutoff clutch 20 described below at an end portion on the other side in the axial direction, and includes a cylindrical shaft convex portion 29 (also referred to as a shaft projection portion) that protrudes in the axial direction from a central portion of an end surface on the other side in the axial direction of an output side engaging portion 28 provided on the output portion 27. The second shaft 23 is coaxially arranged with the first shaft 22 by internally fitting (spigot fitting) the shaft convex portion 29 with the shaft concave portion 26 of the first shaft 22 so that there is no looseness in the radial direction and so that relative rotation is possible.

The second shaft 23 has a gear portion 30 of a torque output portion on an outer peripheral surface of an intermediate portion in the axial direction, and has a flange portion 31 protruding outward in the radial direction at a portion between the output portion 27 and the gear portion 30 in the axial direction. The gear portion 30 is configured by helical gears, spur gears, or the like.

In the present example, the second shaft 23 is constructed such that a cylindrical member 33 having the gear portion 30 around an outer peripheral surface thereof is externally fitted to an intermediate portion in the axial direction of a stepped column-shaped member 32 having the output portion 27, the shaft convex portion 29, and the flange portion 31 so that relative rotation is not possible. However, in a case of embodying the present invention, it is also possible to integrally configure the second shaft as a whole.

The bearing device 3 is externally fitted at an end portion on the one side in the axial direction of the second shaft 23 located on the opposite side of the first shaft 22 so as to sandwich the gear portion 30 in the axial direction, and rotatably supports the second shaft 23 to the fixed portion 34. In other words, the second shaft 23 is such that the end portion on the one side in the axial direction is rotatably supported with respect to the fixed portion 34 by the bearing device 3.

In the present example, the bearing device 3 is configured by a single row radial rolling bearing. That is, the bearing device 3 has an inner ring 35 externally fitted to the end portion on the one side in the axial direction of the second shaft 23, an outer ring 36 internally fitted to an inner peripheral surface of the fixed portion 34, and balls 37 arranged between the inner ring 35 and the outer ring 36 so as to be able to freely roll. More specifically, the bearing device 3 can, for example, be configured by a four-point contact type or a deep-groove type single-row radial ball bearing.

In the present example, the second shaft 23 is such that the end portion on the one side in the axial direction is rotatably supported with respect to the fixed portion 34 by the bearing device 3, and the shaft convex portion 29 is internally fitted (spigot fitted) without looseness with the shaft concave portion 26 of the first shaft 22. Therefore, it can be said that in an unlocked state of the reverse input cutoff clutch 20 described below, the second shaft 23 is such that the end portion on the other side in the axial direction is rotatably supported by the motor housing 1 through an spigot fitting portion between the shaft convex portion 29 and the shaft concave portion 26, the first shaft 22, and the bearing 24a on the one side in the axial direction. However, as will be described below, as long as the coaxiality between the first shaft 22 and the second shaft 23 can be ensured, the shaft convex portion and the shaft concave portion may be omitted. In either case, in the electric motor with a reverse input cutoff clutch of the present example, a radial bearing is not provided between a portion of the second shaft 23 that is located on the other side in the axial direction on a side closer to the first shaft 22 than the gear portion 30 and the motor housing 1 or the fixed portion 34 without interposing other members.

In the present example, in a state in which the end portion on the one side in the axial direction of the second shaft 23 is rotatably supported with respect to the fixed portion 34 by the bearing device 3, the output portion 27 and the shaft convex portion 29 of the second shaft 23 are arranged on an inner side of the clutch housing portion 21 of the motor housing 1. In the present example, a sealing device 38 is placed between an inner peripheral surface of the inner-diameter side annular portion 17 of the second housing element 7 and an outer peripheral surface of the flange portion 31 of the second shaft 23. As a result, a portion between the inner peripheral surface of the inner-diameter side annular portion 17 and the outer peripheral surface of the flange portion 31 is sealed, grease is prevented from leaking from the motor housing 1, and foreign matter is prevented from entering into the motor housing 1 from the outside. The sealing device 38 may be configured by, for example, a contact-type sealing ring.

The reverse input cutoff clutch 20 has a function that, in a case where rotational torque is input to the first shaft 22, transmits the rotational torque that is input to the first shaft 22 to the second shaft 23, and in a case where rotational torque is reversely input to the second shaft 23, completely cuts off the rotational torque that is reversely input to the second shaft 23 and does not transmit the rotational torque to the first shaft 22, or transmits part of the rotational torque that is reversely input to the second shaft 23 to the first shaft 22 and cuts off the remaining portion. In the present example, the reverse input cutoff clutch 20 is arranged on the inner side of the clutch housing portion 21 (second housing element 7) of the motor housing 1. The construction of the reverse input cutoff clutch 20 will be described in detail below.

The rotor 4 is arranged (externally fitted) around an intermediate portion in the axial direction of the first shaft 22 so as to integrally rotate with the first shaft 22. Note that, as the rotor 4, various types of conventionally known construction such as a cage type, a winding type, and a permanent magnet type may be adopted.

The stator 5 is arranged around the rotor 4 and is coaxial with the rotor 4, and is supported by and fixed to an inner side of the drive unit housing portion 19 of the motor housing 1. More specifically, an inner peripheral surface of the stator 5 faces an outer peripheral surface of the rotor 4 through a small gap in the radial direction, and an outer peripheral surface of the stator 5 is supported by and fixed to an inner peripheral surface of the cylindrical portion 10 of the main body portion 8 of the first housing element 6. As the stator 5, various types of conventionally known construction such as a winding type and a permanent magnet type may be adopted.

Next, the construction and operation of the reverse input cutoff clutch 20 will be described.

<Explanation of Construction of Reverse Input Cutoff Clutch 20>

The reverse input cutoff clutch 20 includes the input portion 25, the output portion 27, the pressed surface 39, an engaging element 40, and an urging member 41.

Figure 3:
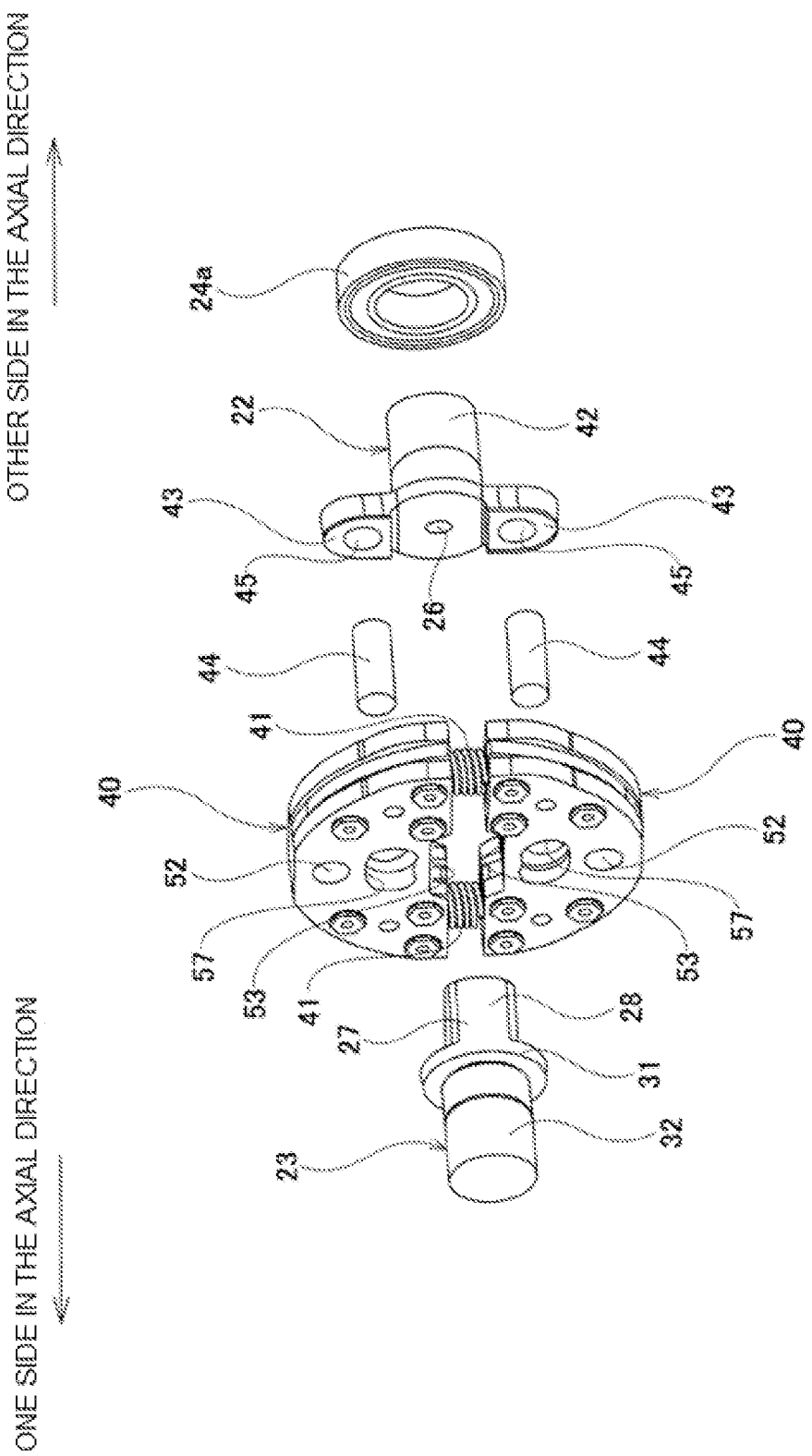
FIG. 3 is an exploded perspective view of a first shaft, a second shaft, and two engaging elements of the reverse input cutoff clutch of the first example.

The input portion 25 is provided in a range from a portion on the one side in the axial direction of the first shaft 22, or more specifically, from a portion where the bearing 24a is externally fitted on the one side in the axial direction to the end portion on the one side in the axial direction. In the present example, the input portion 25, as illustrated in FIG. 3, has an input shaft portion 42, an input arm portion 43, and an input side engaging portion 44.

The input shaft portion 42 is formed in a columnar shape, and is provided in a portion of the first shaft 22 including a portion where the bearing 24a is externally fitted. Note that the input portion 25 further includes the shaft concave portion 26 that is recessed in the axial direction from a central portion of an end surface on the one side in the axial direction of the input shaft portion 42. That is, in the present example, the bearing 24a on the one side in the axial direction has both a function of rotatably supporting a portion on the one side in the axial direction the first shaft 22 with respect to the motor housing 1, and a function of rotatably supporting the input portion 25 of the reverse input cutoff clutch 20.

In the present example, the input arm portion 43 is composed of two input arm portions 43. The two input arm portions 43 project from an end portion on the one side in the axial direction of the input shaft portion 42 toward opposite sides in the radial direction from each other, and have fitting holes 45, which are through holes in the axial direction, in intermediate portions in the radial direction of each. In the present example, in a state in which the first shaft 22 is rotatably supported on the inner side of the first housing element 6, the two input arm portions 43 and the ridges 13 are superposed in the radial direction. More specifically, the end portions on the other side in the axial direction of the two input arm portions 43 are located on an inner side in the radial direction of the end portions on the one side in the axial direction of the ridges 13.

The input side engaging portion 44 is configured by two input side engaging portions 44. Each of the input side engaging portions 44 is configured by a column-shaped pin, and the end portions on the other side in the axial direction are internally fitted and fixed to the fitting holes 45 provided in the two input arm portions 43 by press fitting. In this state, the two input side engaging portions 44 extend to the one side in the axial direction from the two input arm portions 43.

Note that the input portion may be integrally configured as a whole, or in other words, as a single part. In the present example, the input arm portion 43 and the input side engaging portion 44 are configured by two input arm portions 43 and two input side engaging portions 44 depending on the number of engaging elements 40 described below (two in the present example). However, in a case of embodying the present invention, the number of input arm portions and input side engaging portions is not limited to two, and the number of input arm portions and input side engaging portions may be one or may be three or more depending on the number of engaging elements.

The output portion 27 is provided at a portion on the other side in the axial direction of the second shaft 23. As illustrated in FIG. 3, the output portion 27 includes the output side engaging portion 28. In the present example, the output side engaging portion 28 protrudes in the axial direction from an end surface on the other side in the axial direction of a portion of the second shaft 23 where the flange portion 31 is provided. An outer peripheral surface of the output side engaging portion 28, as illustrated in FIGS. 4 to 6, FIG. 19A, and FIG. 19B, has side surfaces 47 on both sides in the minor-axis direction (vertical direction in FIGS. 4 to 6, FIG. 19A, and FIG. 19B), and a pair of guide surfaces 48, which are the side surfaces on both sides in the major-axis direction (horizontal direction in FIGS. 4 to 6, FIG. 19A, and FIG. 19B).

Each of the side surfaces 47 is configured by a flat surface orthogonal to a minor-axis direction of the output side engaging portion 28. Each of the guide surfaces 48 is configured by a curved surface. More specifically, each of the guide surfaces 48 is configured by a partial cylindrical convex surface centered on a center axis of the output side engaging portion 28 (center axis of the second shaft 23). Therefore, in regard to the second shaft 23, an outer peripheral surface of a round bar material, for example, can be used as the pair of guide surfaces 48, and the processing cost can be suppressed accordingly. However, in a case of embodying the present invention, the curved surfaces, which are the pair of guide surfaces, may be partial cylindrical convex surfaces centered on an axis parallel to the center axis of the second shaft 23, or may be non-cylindrical convex surfaces such as partial elliptical convex surfaces. In addition, in the present example, the entire stepped column-shaped member 32 including the output side engaging portion 28 is integrally formed. However, in a case of embodying the present invention, it is also possible to bond and fix a shaft member and the output side engaging portion, which are made separately. The output side engaging portion 28 is arranged further on the inner side in the radial direction than the two input side engaging portions 44, and more specifically, arranged in a portion between the two input side engaging portions 44.

The pressed surface 39 is directly formed on the inner peripheral surface of the motor housing 1 and is configured by a cylindrical concave surface centered on a center of rotation of the output shaft 2. In the present example, the pressed surface 39 is an inner peripheral surface of the clutch housing portion 21, and is directly formed on the inner peripheral surface of a portion on the one side in the axial direction of the cylindrical portion 16 of the second housing element 7, that is, a portion located further on the one side in the axial direction than the portions where the ridges 13 of the first housing element 6 fit. However, it is also possible to internally fit a separate annular member to the inner side of the potion on the one side in the axial direction of the cylindrical portion 16 of the second housing element 7, and to configure the pressed surface 39 by an inner peripheral surface of the annular member. Alternatively, it is possible to fix a friction material to the inner peripheral surface of a portion on the one side in the axial direction of the cylindrical portion 16 of the second housing element 7 by sticking, adhesive or the like, and to configure the pressed surface 39 by an inner peripheral surface of the friction material. It is also possible to form a coating layer on the inner peripheral surface of a portion on the one side in the axial direction of the cylindrical portion 16 of the second housing element 7, and to configure the pressed surface 39 by a surface of the coating layer.

In the present example, the engaging element 40 is configured by two engaging elements 40. Two engaging elements 40 are arranged on an inner side in the radial direction of the pressed surface 39. Each of the engaging elements 40 is configured by a plurality of parts including an engaging element main body 49, and a linking member 50 pivotally linked with respect to the engaging element main body 49. However, in a case of embodying the present invention, the number of engaging elements is not limited to two, and, for example, it is also possible to omit one of the two engaging elements and to configure the engaging element by one engaging element. Alternatively, it is also possible to configure the engaging element by three or more engaging elements.

The engaging element main body 49, as illustrated in FIG. 12 to FIG. 17 is configured by combining a plurality of parts. Hereinafter, the structure of the engaging element main body 49 after assembly will be described, and then the structure of each part of the engaging element main body 49 will be described.

The engaging element main body 49 has a substantially semicircular plate shape, and includes two pressing surfaces 51 facing the pressed surface 39, a pivot support shaft 52 that is a pivot support portion, and an output side engaged portion 53 that engages with the output side engaging portion 28.

In the present example, an outer peripheral surface of the engaging element main body 49 is configured by a convex arc-shaped outer-side surface in a radial direction corresponding to an arc of the engaging element main body 49, and a crank shaped inner-side surface in a radial direction corresponding to chord of the engaging element main body 49. Note that the radial direction of the engaging element main body 49 is said to be a direction orthogonal to the chord of the engaging element main body 49 as indicated by arrow A in FIG. 4, and a width direction of the engaging element main body 49 is said to be a direction parallel to the chord of the engaging element main body 49 as indicated by arrow B in FIG. 4. In the present example, the radial direction of the engaging element main body 49 is a direction in which the engaging element main body 49 of the engaging element 40 moves away from or toward the pressed surface 39 and corresponds to a first direction. The width direction of the engaging element main body 49 is a second direction that is orthogonal to both the first direction and the axial direction of the pressed surface 39.

In the present example, the two engaging elements 40 are arranged on the inner side in the radial direction of the pressed surface 39 in a state in which the outer side surfaces in the radial direction of the engaging element main bodies 49 face toward an opposite side, and the inner side surfaces in the radial direction of the engaging element main bodies 49 face each other. In a state in which the two engaging elements 40 are arranged in this way on the inner side in the radial direction of the pressed surface 39, an inner diameter dimension of the pressed surface 39 and a dimension in the radial direction of the engaging element main body 49 are regulated so that there is a gap in at least one of a portion between the pressed surface 39 and the outer side surfaces in the radial direction of the engaging element main body 49, and a portion between the side surfaces in the radial direction of the engaging element main bodies 49, which allows the engaging element main body 49 to move in the radial direction.

The engaging element main body 49 has two pressing surfaces 51 on the outer side surface in the radial direction. The two pressing surfaces 51 are portions that are pressed against the pressed surface 39 in a locked state or a semi-locked state of the output portion 27 (second shaft 23), and are arranged at two locations of the outer side surface in the radial direction of the engaging element main body 49 separated in a circumferential direction. Each of the pressing surfaces 51 protrudes further toward the pressed surface 39 than portions of the outer side surface of the engaging element main body 49 separated in the circumferential direction from the pressing surfaces 51. Each of the pressing surfaces 51 is a partial cylindrical convex surface having a radius of curvature that is smaller than the radius of curvature of the pressed surface 39. Of the outer side surface in the radial direction of the engaging element main body 49, a portion separated in the circumferential direction from the two pressing surfaces 51, that is, a portion located between the two pressed surfaces 51 in the circumferential direction, is a non-contact surface that does not come in contact with the pressed surface 39.

The engaging element main body 49 has an internal space 54 in a central portion in a thickness direction of a central portion in the width direction (axial direction). End portions on both sides in the radial direction of the internal space 54 are open to the outer side surface in the radial direction and the inner side surface in the radial direction of the engaging element main body 49. The engaging element main body 49 has the pivot support shaft 52 arranged in the axial direction, and an intermediate portion in the axial direction of the pivot support shaft 52 is arranged on an outer side portion in the radial direction of the central portion in the width direction of the internal space 54. The pivot support shaft 52 is configured by a circular column-shaped pin. End portions on both sides in the axial direction of the pivot support shaft 52 are supported by portions of the engaging element main body 49 sandwiching the internal space 54 from both sides in the axial direction.

The engaging element main body 49 has an output side engaged portion 53 in the central portion in the width direction on the inner side surface in the radial direction. The output side engaged portion 53 is configured by a rectangular-shaped concave portion that is recessed outward in the radial direction of the central portion in the width direction of the inner side surface in the radial direction of the engaging element main body 49 (side surface on a far side with respect to the pressed surface 39).

Figure 4:
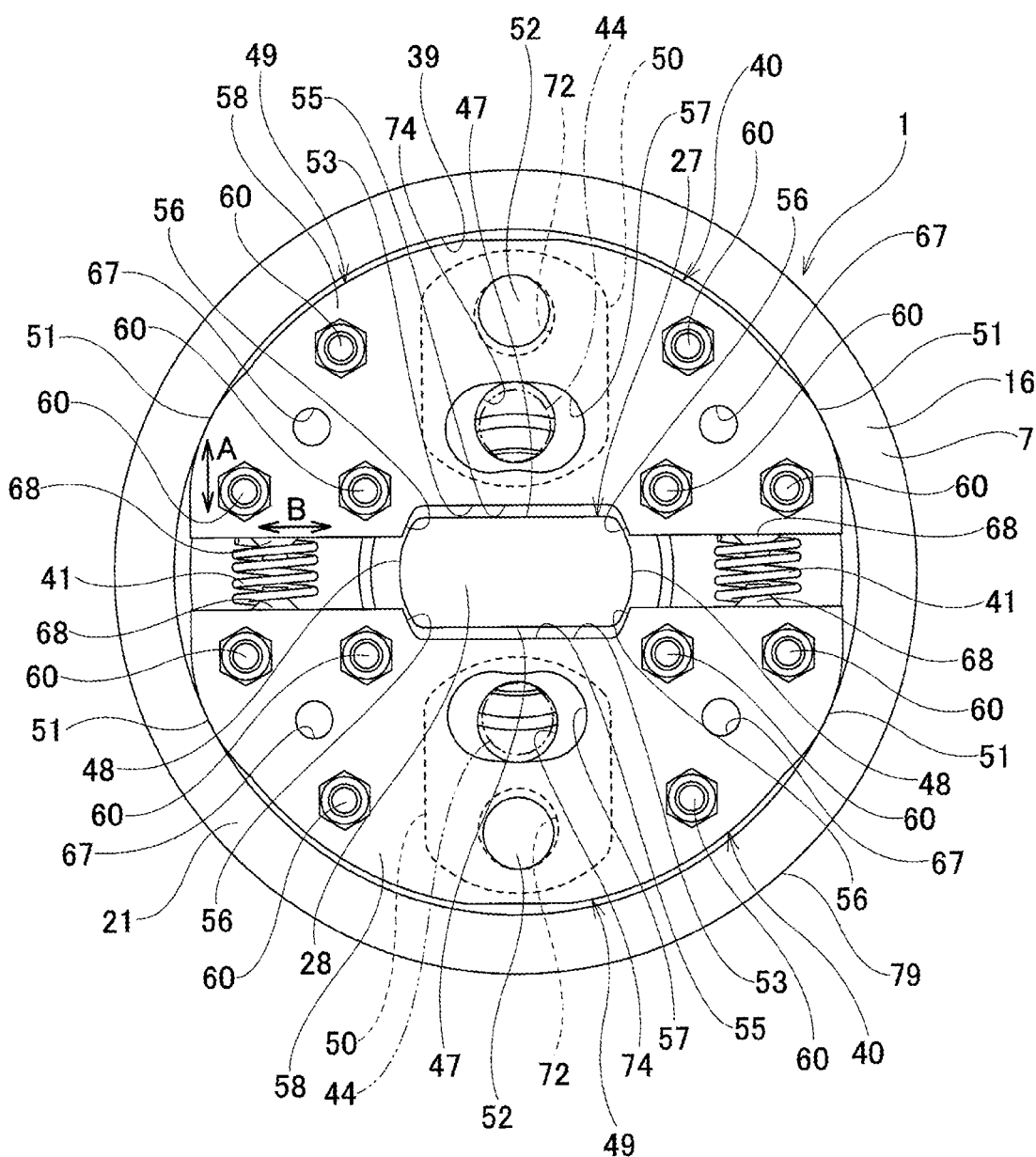
FIG. 4 is a cross-sectional view illustrating the reverse input cutoff clutch of the first example.
Figure 5:
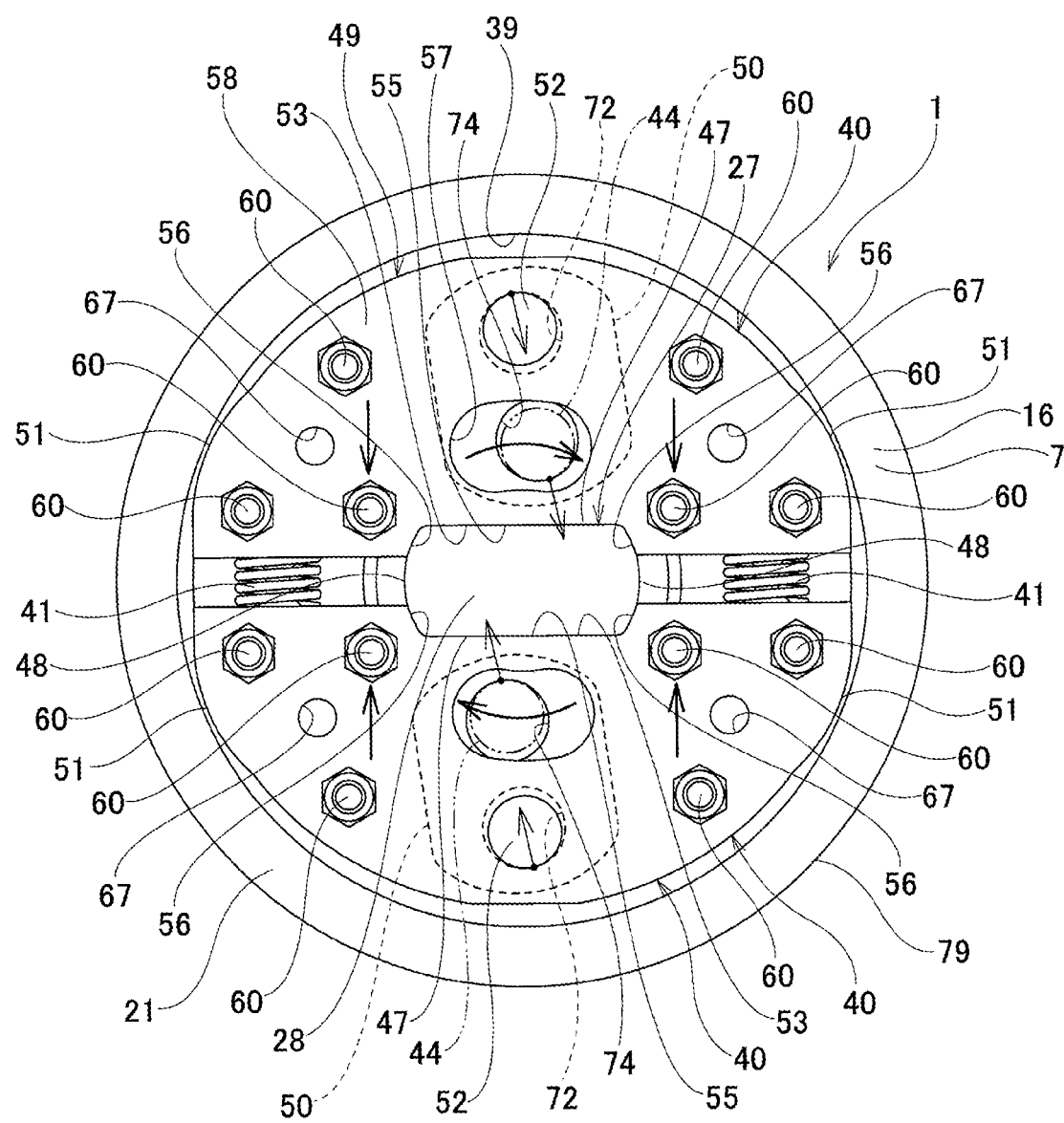
FIG. 5 is a cross-sectional view illustrating the reverse input cutoff clutch of the first example in a state where a rotational torque is input to an input portion thereof.
Figure 19A:
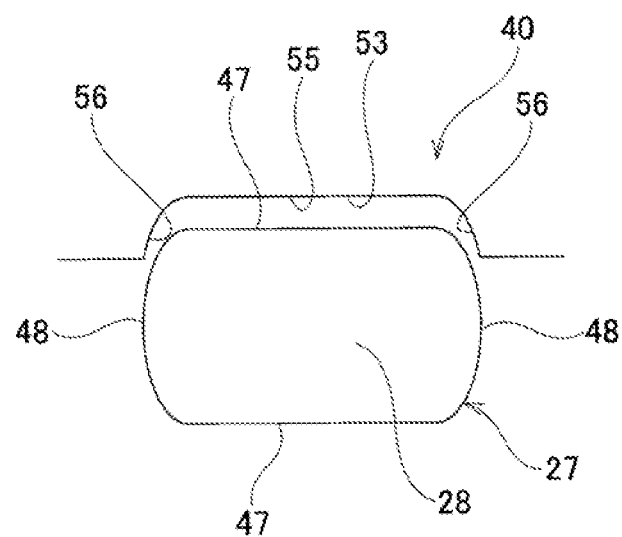
FIG. 19A and FIG. 19B are views illustrating states before and after the output side engaging portion and the output side engaged portion engage in the reverse input cutoff clutch of the first example.
Figure 19B:
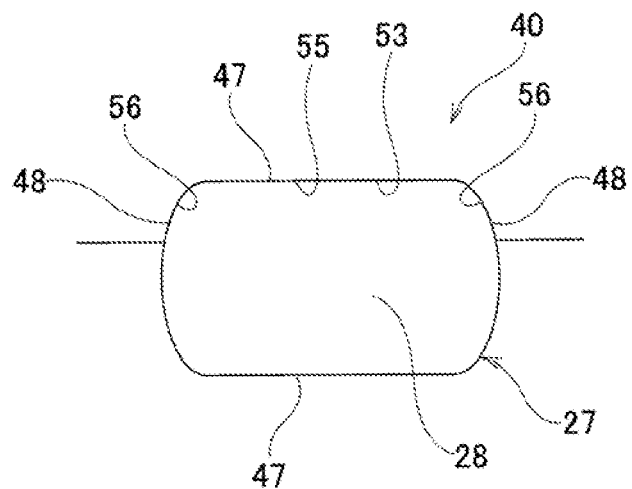

As illustrated in FIG. 4, FIG. 5, FIG. 19A, and FIG. 19B, the output side engaged portion 53 has a size such that a front half portion in the minor-axis direction of the output side engaging portion 28 can be arranged on the inner side thereof. Particularly, in the present example, the output side engaged portion 53, as illustrated in FIG. 5 and FIG. 19B, has an inner surface shape that matches an outer peripheral surface of the front half portion in the minor-axis direction of the output side engaging portion 28.

The inner surface of the output side engaged portion 53 has a bottom surface 55 and a pair of guided surfaces 56. The bottom surface 55 is configured by a flat surface orthogonal to the radial direction of the engaging element main body 49. The pair of guided surfaces 56 of the inner surface of the output side engaged portion 53 are located at the end portions on both sides in the width direction of the engaging element main body 49, and face each other in the width direction. The pair of guided surfaces 56 are configured by a pair of concave curved surfaces inclined in a direction in which a distance between the guided surfaces 56 increases as going inward in the radial direction of the engaging element main body 49, that is, as going in a direction away from the pressed surface 39 in the radial direction of the engaging element main body 49.

The pair of guide surfaces 56 are able to come in contact with the pair of guide surfaces 48 of the output side engaging portion 28, and each of the guided surfaces 56 is configured by a partially cylindrical concave surface having a radius of curvature that is the same as that of each of the guide surfaces 48, or a radius of curvature that is a little larger than that of each of the guide surfaces 48. That is, in the present example, the output side engaged portion 53, as illustrated in FIG. 5 and FIG. 19B, has an inner surface shape that matches the outer peripheral surface of the front half portion in the minor axis direction of the output side engaging portion 28. Therefore, the bottom surface 55 of the output-side engaged portion 53 can be brought into surface contact with the side surface 47 of the output side engaged portion 28, and the pair of guided surfaces 56 of the output side engaged portion 53 can be brought into surface contact with the front half portion in the minor axis direction of the pair of guide surfaces 48 of the output side engaging portion 28. Note that in a case of embodying the present invention, each of the guided surfaces may also be configured by a non-cylindrical concave surface such as a partial elliptical cylindrical concave surface.

The engaging element main body 49 has an insertion hole 57 in an inner side portion in the radial direction of the central portion in the width direction. The insertion hole 57 is configured by an arc-shaped elongated hole that penetrates in the axial direction through the inner side portion in the radial direction of the central portion in the width direction of the engaging element main body 49, and extends in the circumferential direction. The insertion hole 57 has a size such that the input side engaging portion 44 can be loosely inserted therein. More specifically, when the input side engaging portion 44 has been inserted into the inner side of the insertion hole 57, there is a gap in the circumferential direction between the input side engaging portion 44 and an inner surface of the insertion hole 57, and there is a gap in the radial direction of the engaging element main body 49 therebetween. Therefore, due to the gap in the circumferential direction, the input side engaging portion 44 is able to displace in a rotational direction of the input portion 25 (first shaft 22) with respect to the insertion hole 57 of the engaging element main body 49. In addition, in a case where rotational torque is reversely input to the output portion 27, due to the gap in the radial direction of the engaging element main body 49, the engaging element main body 49 is able to displace in the radial direction with respect to the input side engaging portion 44. In other words, the size of the insertion hole 57 is regulated so that during operation of the reverse input cutoff clutch 20 described below, operation will not be hindered by interference between an outer peripheral edge of the insertion hole 57 and the input side engaging portion 44.

The engaging element main body 49 is configured by combining a plurality of parts. More specifically, the engaging element main body 49 includes a pair of main body plates 58, a pair of intermediate plates 59, the pivot support shaft 52, and a plurality of bolts 60 and nuts 61 as connecting members.

The pair of main body plates 58 are parts that form portions on both sides in the thickness direction of the engaging element main body 49, and are arranged so as to be superimposed in the axial direction. Each of the main body plates 58 is a press-molded part manufactured by punching a metal plate such as a steel plate by press working. Each main body plates 58 has convex surfaces 62 at two locations of the outer side surface in the radial direction that are separated in the circumferential direction, and that, in the assembled state of the engaging element main body 49, form the pressing surfaces 51. Each main body plate 58 has a circular installation hole 63 in a central portion in the width direction of an outer side portion in the radial direction. Each main body plate 58 has a concave portion 64 in the central portion in the width direction of an inner side surface in the radial direction, and that, in the assembled state of the engaging element main body 49, forms the output side engaged portion 53. Therefore, in the present example, two concave portions 64 are arranged separated in the axial direction, and form the output side engaged portion 53. Each main body plate 58 has a through hole 65 in the central portion in the width direction of an inner side portion in the radial direction, and the through hole 65, in the assembled state of the engaging element main body 49, forms the insertion hole 57. The engaging element main body 49 has a plurality (three in the illustrated example) of through holes 66 in each of both side portions in the width direction. The engaging element main body 49 has positioning holes 67 at a plurality of locations separated from the through holes 66 in each of both side portions in the width direction.

The pair of intermediate plates 59 are members that form an intermediate portion in the thickness direction of the engaging element main body 49. Each of the intermediate plates 59 is a press-molded part manufactured by punching a metal plate such as a steel plate by press working, and has a substantially fan plate shape. The pair of intermediate plates 59 is sandwiched between portions on both sides in the width direction of the pair of main body plates 58. An outer side surface in the radial direction of each intermediate plate 59 is located further on the inner side in the radial direction than the outer side surfaces in the radial direction of the pair of main body plates 58, and does not come in contact with the pressed surface 39. Each intermediate plate 59 has a convex portion 68 in an intermediate portion in the width direction of the inner side surface in the radial direction. The convex portion 68 protrudes further inward in the radial direction than the inner side surfaces in the radial direction of the pair of main body plates 58. A portion of each of the intermediate plates 59 other than the convex portion 68 is arranged between the pair of main body plates 58. Each of the intermediate plates 59 has through holes 69 at a plurality of locations aligned with the through holes 66 of the pair of main body plates 58. Each intermediate plate 59 has positioning holes 70 at locations aligned with respective positioning holes 67 of the pair of main body plates 58.

The pair of main body plates 58 and the pair of intermediate plates 59 are connected and fastened together by screwing nuts 61 on tip end portions of the plurality of bolts 60 that are inserted through the through holes 66 of the pair of main body plates 58 and the through holes 69 of the pair of intermediate plates 59 that are aligned with each other, and further tightened. Note that in the construction of the present example, when performing this kind of connecting and fastening work, by inserting a positioning rod for alignment work through the positioning holes 67 of the pair of main body plates 58 and the positioning holes 70 of the pair of intermediate plates 59 that are aligned with each other, the work of aligning the through holes 66 of the pair of main body plates 58 and the through holes 69 of the pair of intermediate plates 59 may be more easily performed. In the construction of the present example, in a state in which the pair of main body plates 58 and the pair of intermediate plates 59 are connected and fastened together as described above, the internal space 54 is formed between the pair of intermediate plates 58, and between the pair of intermediate plates 59 in the width direction.

The pivot support shaft 52 is configured by a circular column-shaped pin. End portions on both sides in the axial direction of the pivot support shaft 52 are internally fixed in the installation holes 63 in the pair of main body plates 58 by press fitting. An intermediate portion in the axial direction of the pivot support shaft 52 is arranged in the internal space 54.

Figure 16:
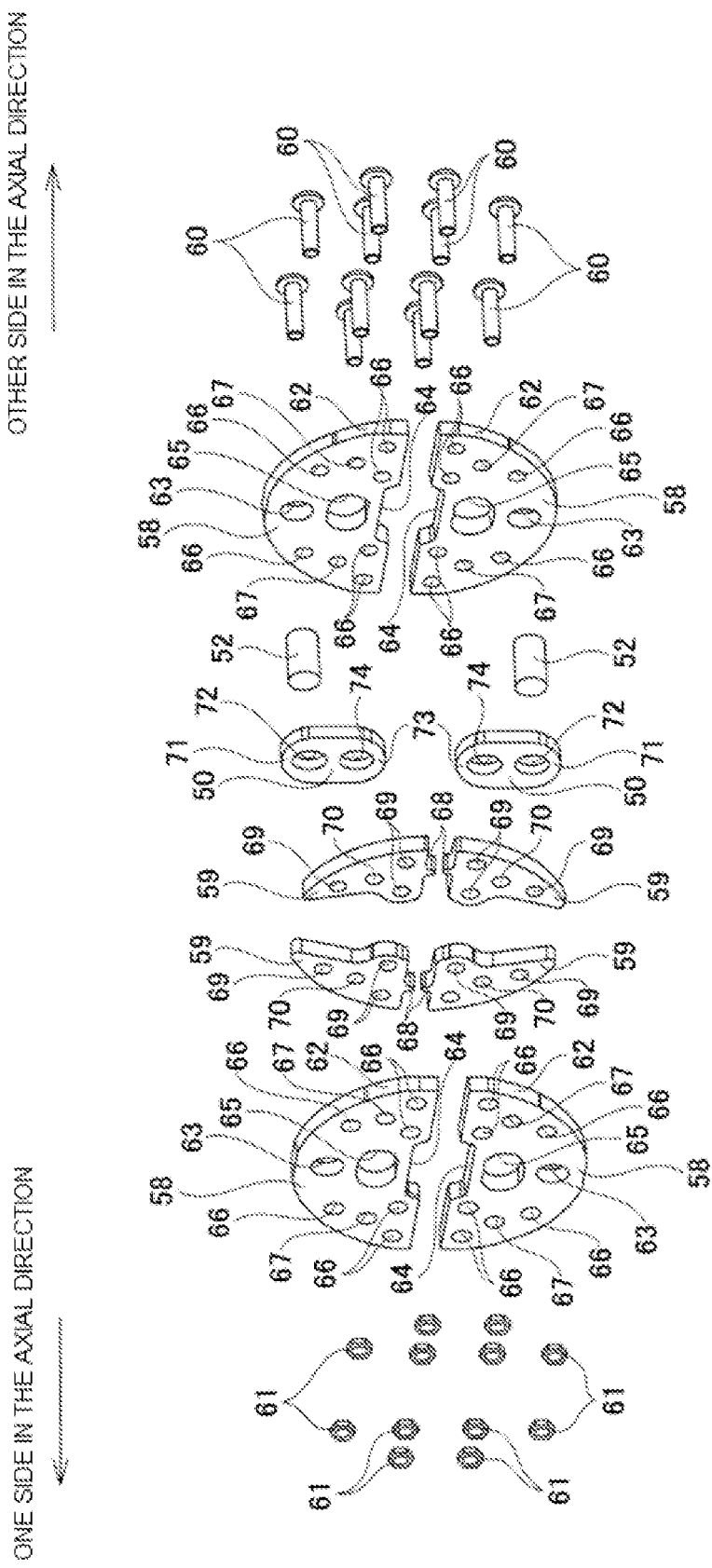
FIG. 16 is an exploded perspective view of the two engaging elements of the reverse input cutoff clutch of the first example.
Figure 17:
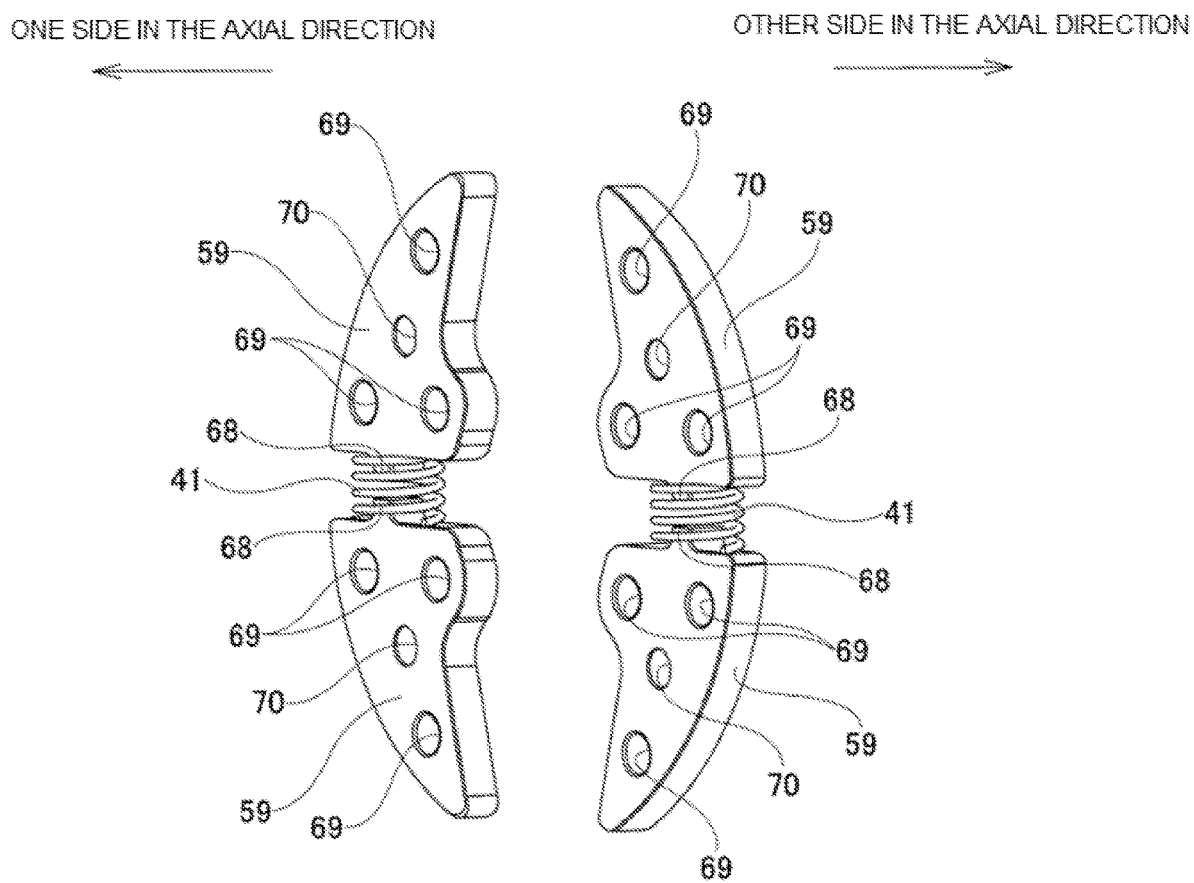
FIG. 17 is a perspective view of an intermediate plate and an urging member of the two engaging elements of the reverse input cutoff clutch of the first example.

The linking member 50, as illustrated in FIG. 16, is a press-molded part manufactured by punching a metal plate such as a steel plate by press working, and has a substantially rectangular plate shape or a substantially oval plate shape, and is arranged in the internal space 54 of the engaging element main body 49, that is, between a pair of main body plates 58 in the axial direction and between a pair of intermediate plates 59 in the circumferential direction.

A thickness dimension of the linking member 50 is smaller than a width dimension in the axial direction of the internal space 54 (=distance between opposing side surfaces of the pair of main body plates 58=thickness dimension of the intermediate plates 59). The linking member 50, in a first end portion 71 that is an end portion on one side in a lengthwise direction thereof, has a support hole 72, which is a circular hole penetrating in the axial direction, and forms a pivot supported portion, and in a second end portion 73 that is an end portion on the other side in the lengthwise direction thereof, has an input side engaged portion 74, which is a circular hole penetrating in the axial direction.

The pivot support shaft 52 is inserted into the support hole 72. As a result, the first end portion 71 is pivotally linked to the pivot support shaft 52. The input side engaging portion 44 is loosely inserted into an input side engaged portion 74. As a result, the second end portion 73 is pivotally linked to the input side engaging portion 44.

Figure 9:
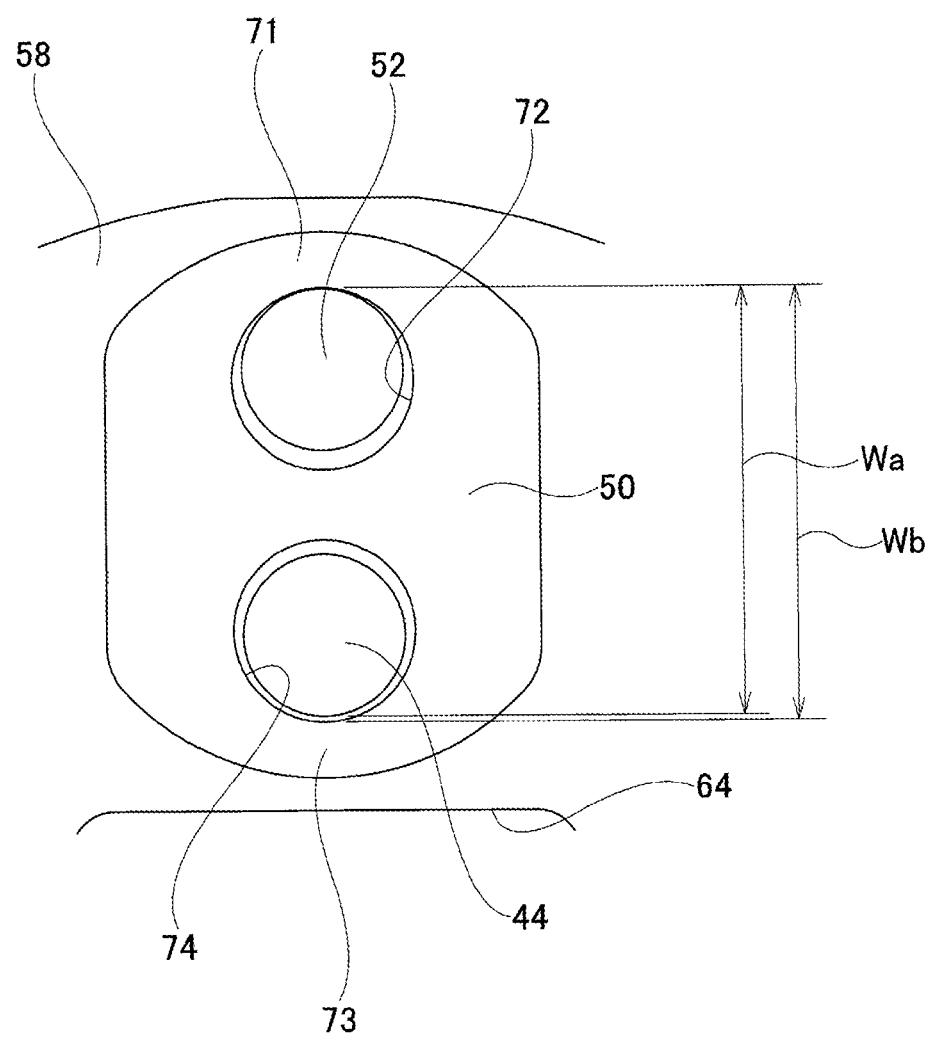
FIG. 9 is an enlarged view of the central portion in the left-right direction of the upper half portion of FIG. 7.
Figure 10:
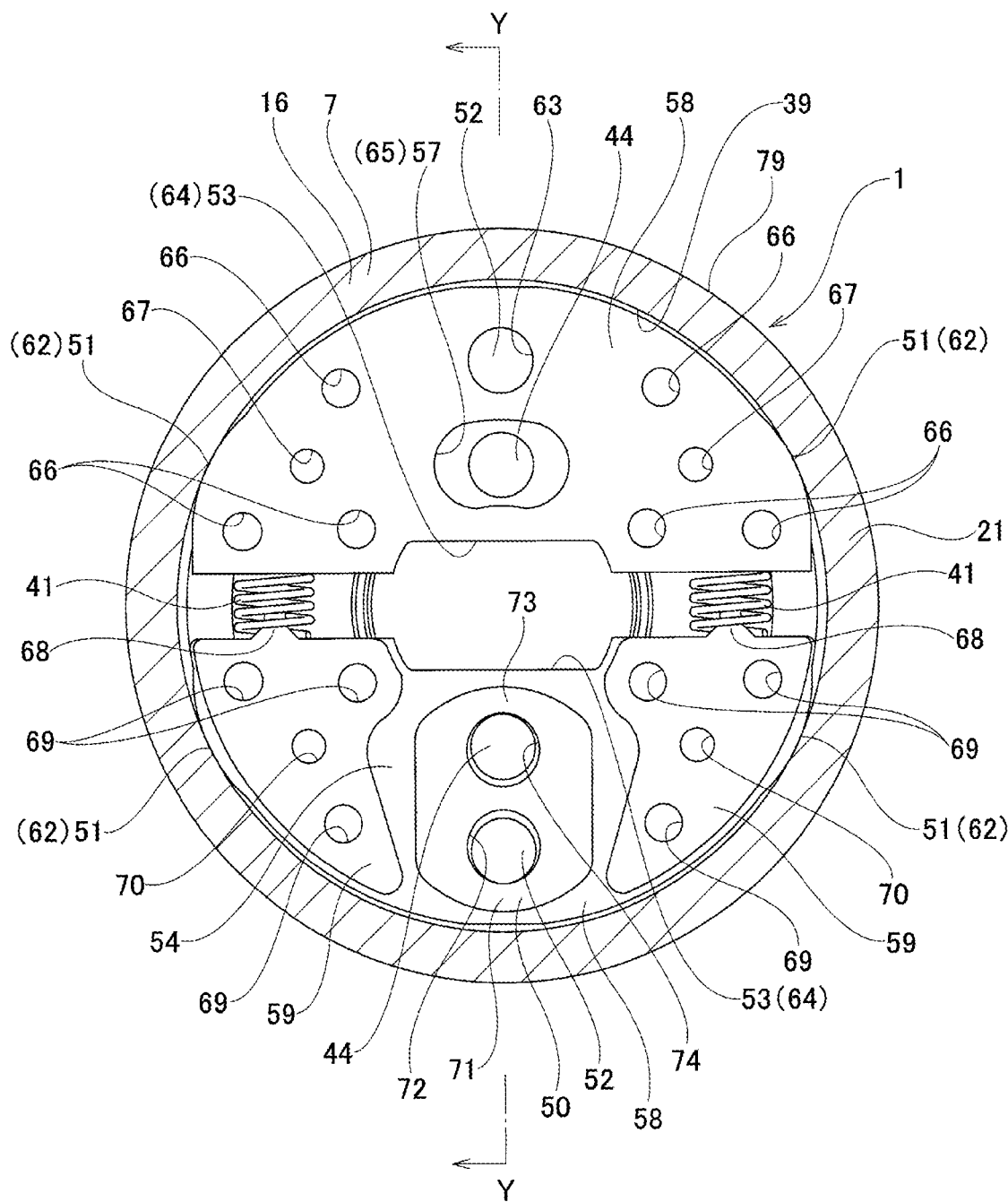
FIG. 10 is a diagram illustrating an upper half portion of the reverse input cutoff clutch illustrated in FIG. 7 with an intermediate plate and a linking member removed.
Figure 11:
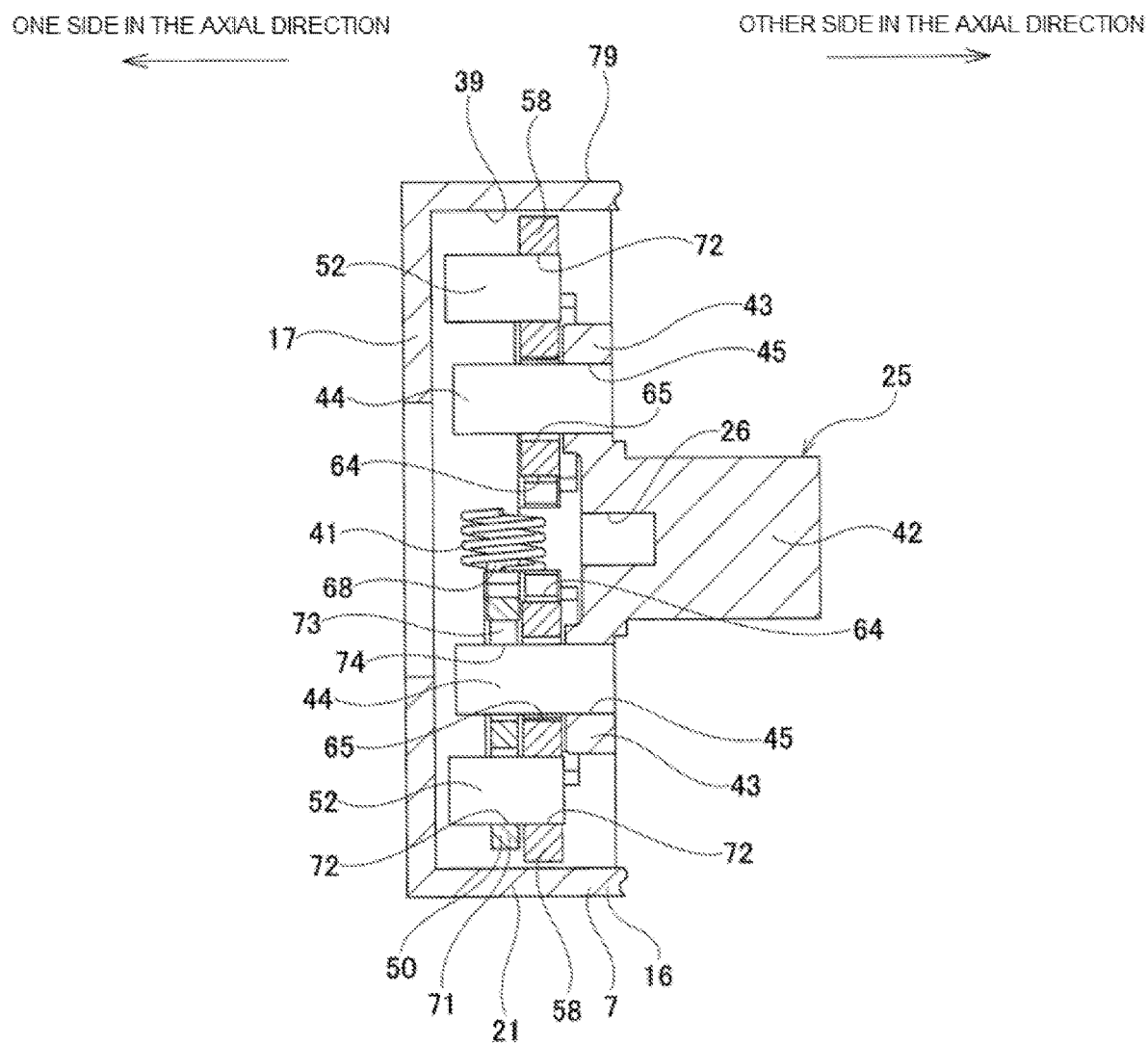
FIG. 11 is a cross-sectional view taken along section line Y-Y in FIG. 10.

The support hole 72 has an inner diameter larger than an outer diameter of the pivot support shaft 52 so that the pivot support shaft 52 can be loosely inserted into the support hole 72. In addition, the input side engaged portion 74 has an inner diameter dimension larger than an outer diameter dimension of the input side engaging portion 44 so that the input side engaging portion 44 can be loosely inserted into the input side engaged portion 74. Furthermore, in a state in which the two pressing surfaces 51 of the engaging element 40 are in contact with the pressed surface 39 and the input side engaging portion 44 is located at the central portion in the width direction of the engaging element main body 49, as illustrated in FIG. 9, a distance Wa between end edges of sides of the pivot support shaft 52 and the input side engaging portion 44 that are far from each other is set to be equal to or less than the distance Wb between the end edges of sides of the support hole 72 and the input side engaged portion 74 that are far from each other (Wa≤Wb).

From the aspect of facilitating the assembly of the reverse input cutoff clutch 20, it is desirable that the difference Wb−Wa between the distance Wa and the distance Wb be as large as possible. However, when rotational torque is input to the input portion 25, from the aspect of immediately being able to achieve an unlocked state by moving the engaging element 40 inward in the radial direction, it is desirable that the difference Wb−Wa be as small as possible.

Figure 12:
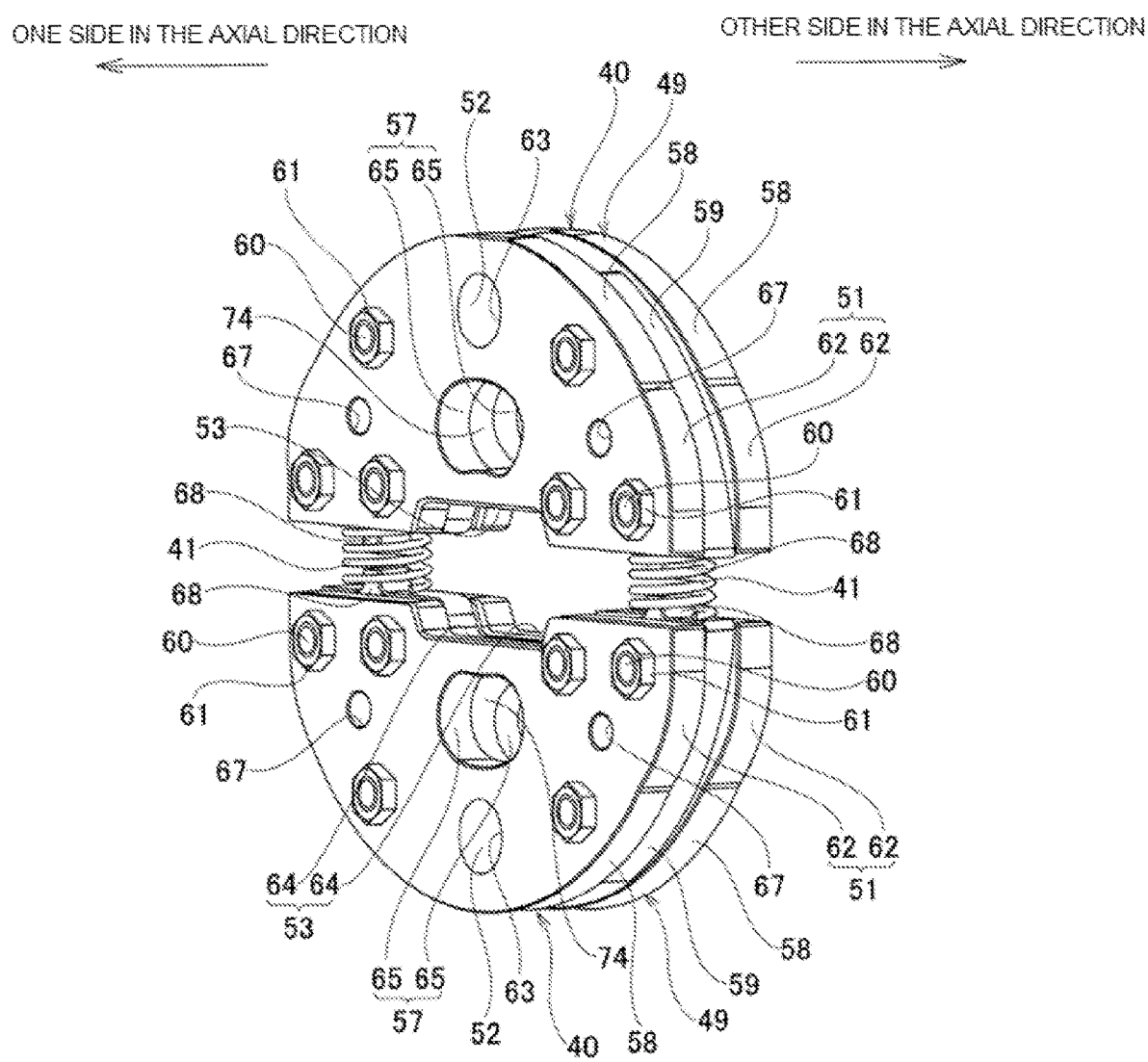
FIG. 12 is a perspective view illustrating two engaging elements and an urging member of the reverse input cutoff clutch of the first example.
Figure 13:
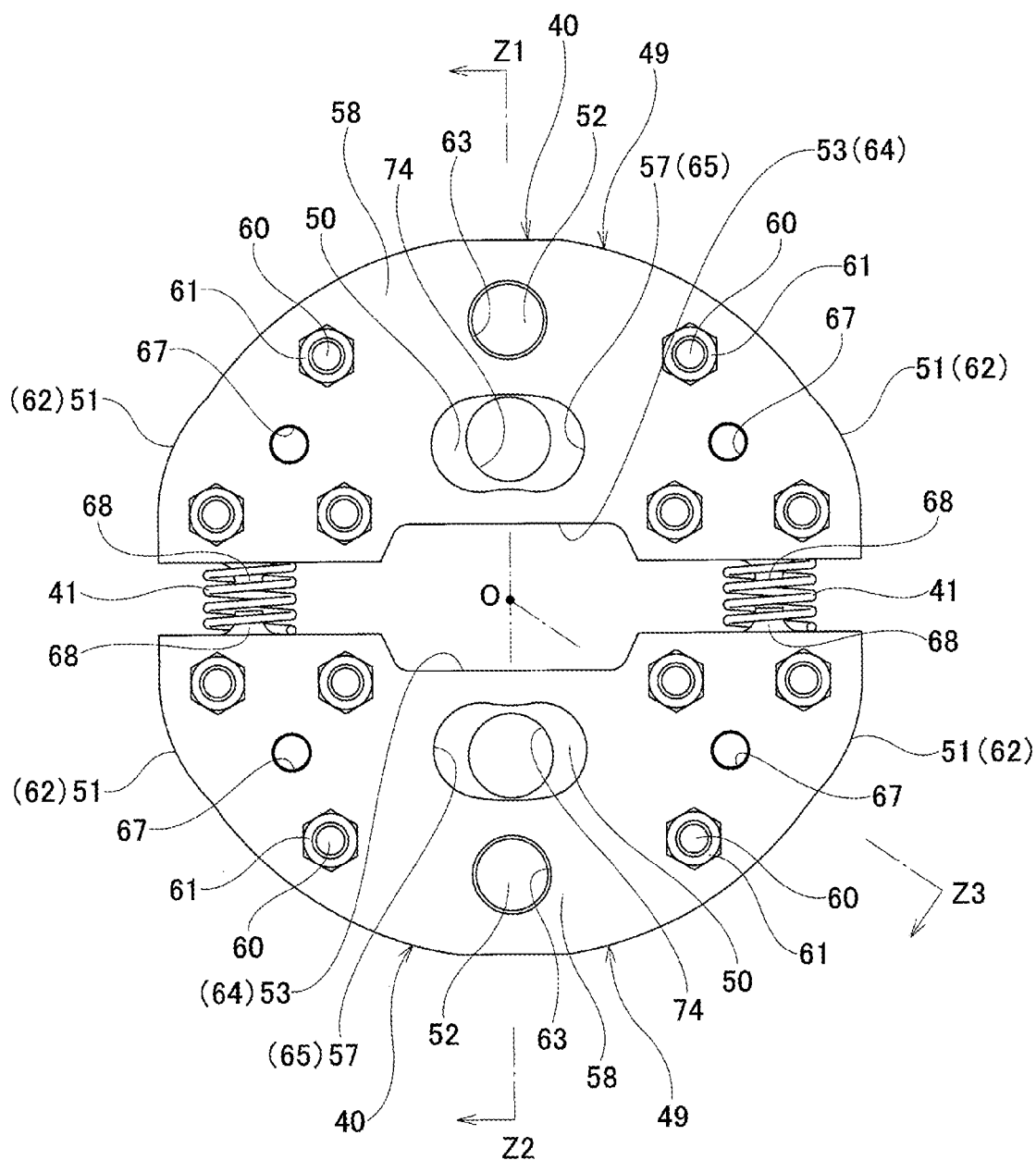
FIG. 13 is a view as seen from one side in the axial direction of the two engaging elements and the urging member of the reverse input cutoff clutch of the first example.

In the present example, the urging member 41 is configured by two urging members 41. As illustrated in FIG. 12 and FIG. 13, the two urging members 41 are arranged between both side portions in the width direction of the inner side surfaces in the radial direction of the two engaging element main bodies 49 of the two engaging elements 40. That is, the two urging members 41 are arranged at positions separated from the output side engaging portion 28 in the width direction of the engaging element main bodies 49 corresponding to the second direction. The two urging members 41 elastically press the two engaging elements 40 in a direction toward that outer side in the radial direction, that is, presses the two engaging elements 40 in a direction approaching the pressed surface 39. As a result, in a neutral state in which torque is not applied to the input portion 25 (first shaft 22) and the output portion 27 (second shaft 23), the two pressing surfaces 51 of each of the engaging elements 40 are set into a state of being in contact with the pressed surface 39.

In the present example, each urging member 41 is configured by a coil spring, and by inserting the convex portions 68 of the two engaging elements 40 inside both side portions in the axial direction of the urging member 41, the urging member 41 is prevented from falling out from between the inner side surfaces in the radial direction of the two engaging element main bodies 49.

Figure 14:
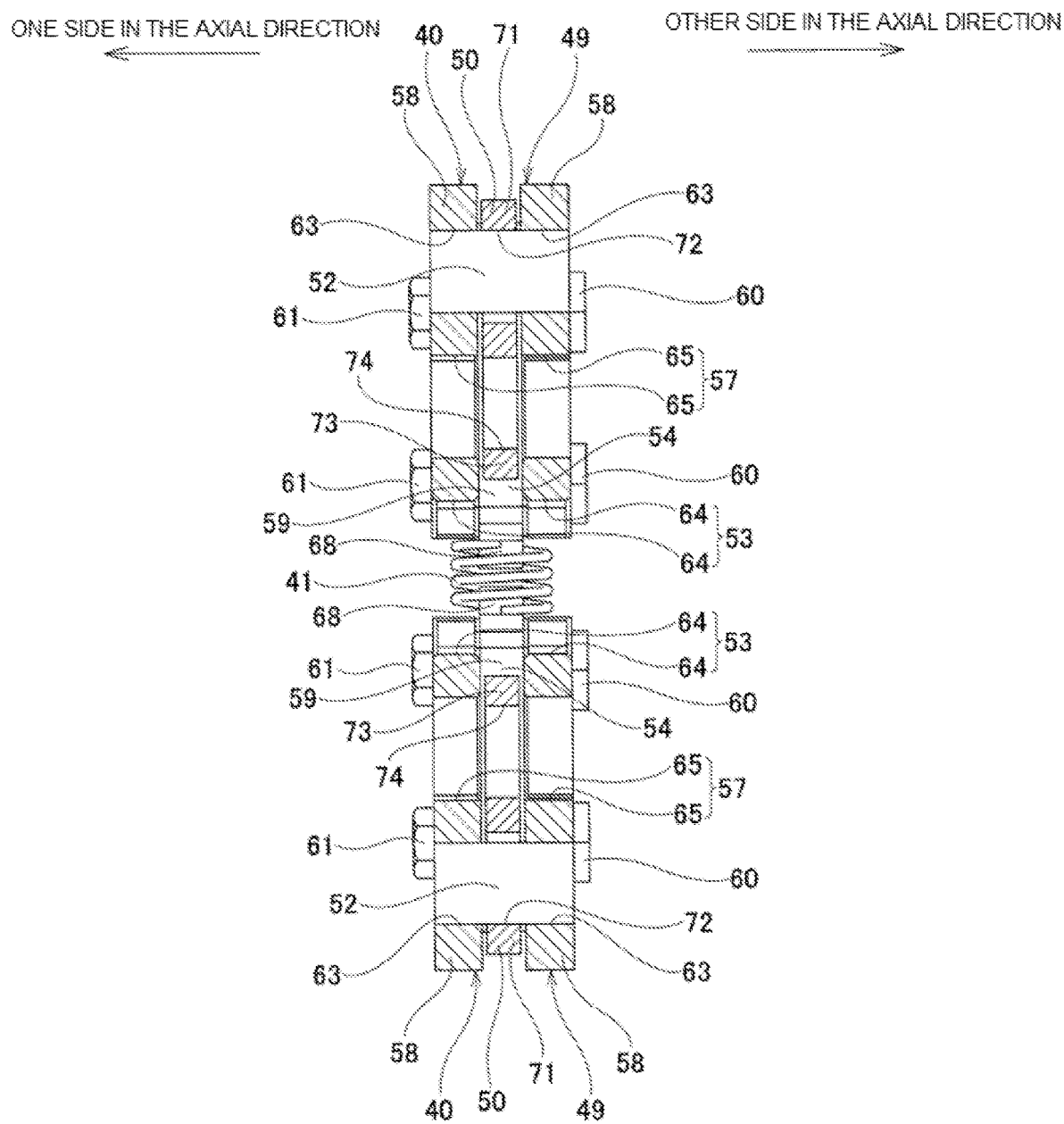
FIG. 14 is a cross-sectional view taken along section line Z1-Z2 in FIG. 13.
Figure 15:
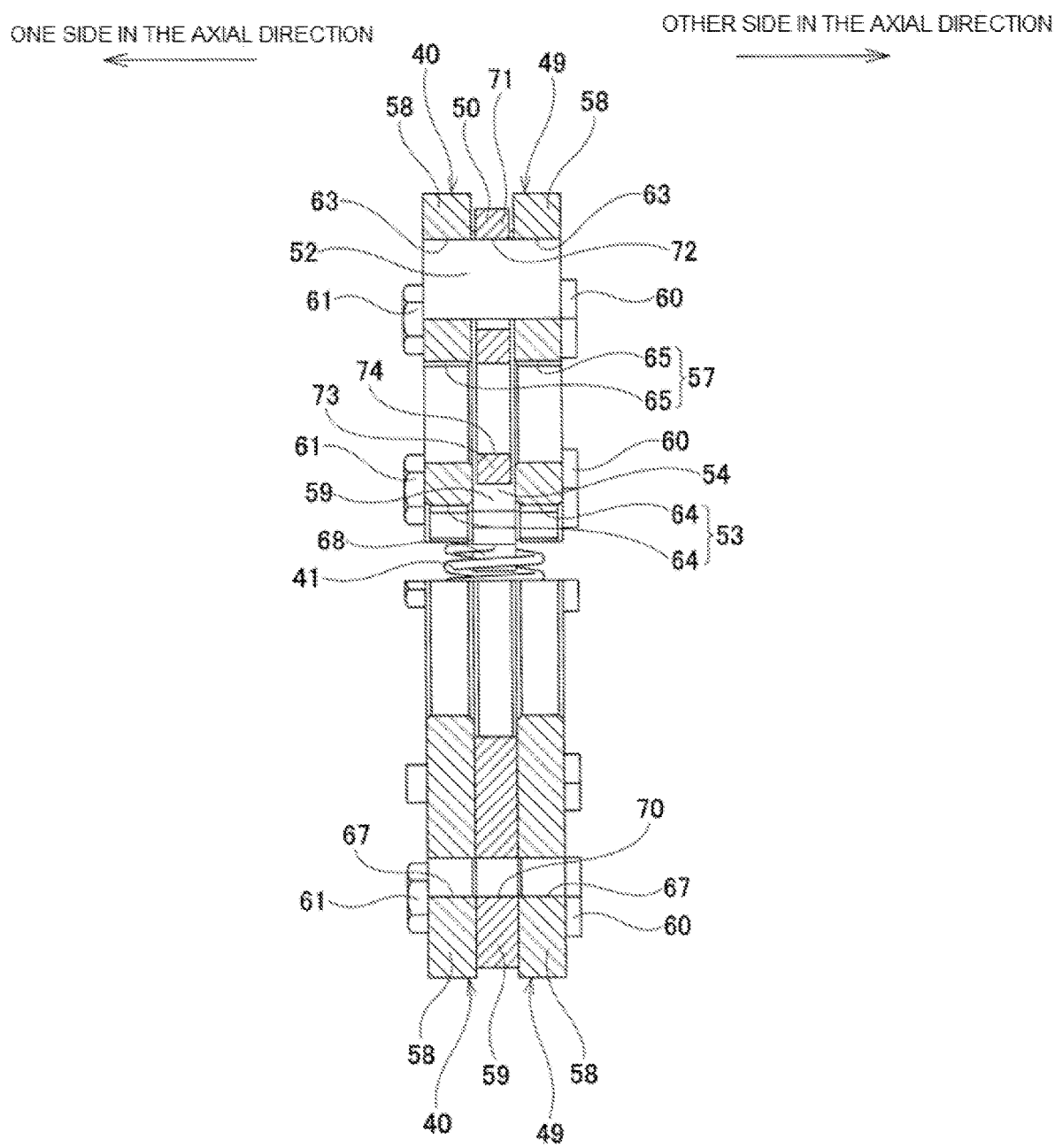
FIG. 15 is a cross-sectional view taken along section line Z1-O-Z3 in FIG. 13.

In the present example, an outer diameter dimension of the urging member 41 is smaller than the thickness dimension in the axial direction of the engaging element main body 49. Therefore, the urging member 41, as illustrated in FIG. 14 and FIG. 15, does not protrude to both sides (outer sides) in the axial direction further than the side surfaces of both sides in the axial direction of the engaging element main body 49.

The reason for keeping the two pressing surfaces 51 of each engaging element 40 in contact with the pressed surface 39 in the neutral state as described above is so that, as will be described later, when rotational torque is reversely input to the output portion 27, a locked state will be immediately achieved.

The reverse input cutoff clutch 20 is such that, in the assembled state, the two input side engaging portions 44 of the input portion 25 arranged on the other side in the axial direction are inserted in the axial direction into the insertion holes 57 (through hole 65 of the main body plate 58) of the two engaging elements 40 and into the input side engaged portion 74 of the linking member 50, and the output side engaging portion 28 of the output portion 27 arranged on the one side in the axial direction is inserted in the axial direction between the output side engaged portions 53 of the two engaging elements 40. That is, the two engaging elements 40 are arranged so as to sandwich the output side engaging portion 28 from the outer sides in the radial direction by the output side engaged portion 53 of each engaging element 40.

<Description of Operation of Reverse Input Cutoff Clutch 20>

Next, the operation of the reverse input cutoff clutch 20 will be described.

(Case where Rotational Torque is Input to the Input Portion 25 (First Shaft 22))

First, a case where rotational torque is input to the input portion 25 (first shaft 22) will be described. In the electric motor with a reverse input cutoff clutch of the present example, the first shaft 22 of the output shaft 2 is rotationally driven by energizing the stator 5 and applying rotational force to the rotor 4 on the inner side of the stator 5. When the first shaft 22 is rotationally driven, as illustrated in FIG. 5, the input side engaging portion 44 of the input portion 25 rotates in the rotation direction of the first shaft 22 (clockwise in the example of FIG. 5) on the inner side of the input side engaged portion 74. As a result, as illustrated in FIG. 4 and FIG. 5, the input side engaging portion 44, due to the engagement with the input side engaged portion 74, moves the link member 50 inward in the radial direction while causing the linking member 50 to pivot. Accordingly, the input side engaging portion 44 pulls the pivot support shaft 52 inward in the radial direction through the linking member 50. As a result, as illustrated in FIG. 5, each of the two engaging elements 40 moves in a direction (inward in the radial direction) away from the pressed surface 39. The two pressing surfaces 51 of the two engaging elements 40 are separated from the pressed surface 39, and as illustrated in FIG. 19A and FIG. 19B, the output side engaged portions 53 of the two engaging elements 40 sandwich the output side engaging portion 28 of the output portion 27 from both sides in the radial direction, and the output side engaging portion 28 and the output side engaged portions 53 are engaged without looseness. As a result, the rotational torque that is input to the input portion 25 is transmitted to the output portion 27 (second shaft 23) through the two engaging elements 40, and obtained from the gear portion 30 of the second shaft 23. More specifically, torque is transmitted to a gear engaging with the gear portion 30, or to a belt passed over the gear portion 30.

Particularly, in the construction of the present example, when the engaging element 40 moves away from the pressed surface 39 (inward in the radial direction) as described above, as illustrated in FIG. 4 to FIG. 5 and FIG. 19A to FIG. 19B, the pair of guide surfaces 48 provided on the output side engaging portion 28 guide the pair of guided surfaces 56 provided on the output side engaged portion 53, which regulates the engaging element 40 to move in the width direction. Then, as illustrated in FIG. 5 and FIG. 19B, the bottom surface 55 of the output side engaged portion 53 comes in surface contact with the side surface 47 of the output side engaging portion 28, and the pair of guided surfaces 56 of the output side engaged portion 53 comes in surface contact with the pair of guide surfaces 48 of the output side engaging portion 28. Therefore, in the construction of the present example, after the locked state or semi-locked state has been released, it is possible to effectively prevent the engaging element 40 from shifting in the width direction and coming into contact with the pressed surface 39.

In the construction of the present example, guiding the movement of the engaging element 40 inward in the radial direction as described above can be performed by using the output side engaging portion 28, and thus the number of parts can be reduced as compared with construction in which a separate part is used only for performing the guidance.

In addition, in the construction of the present example, each of the pair of guided surfaces 56 of the output side engaged portion 53 is configured by a pair of concave curved surfaces inclined in a direction in which the distance therebetween increases as going toward the inner side in the radial direction, and each of the pair of guide surfaces 48 of the output side engaging portion 28 is configured by a pair of convex curved surfaces that match the pair of concave curved surfaces. Therefore, as illustrated in FIG. 19A, in a state in which the engaging element 40 is separated outward in the radial direction from the output side engaging portion 28, gaps are formed between the pair of guided surfaces 56 and the pair of guide surfaces 48, and the size (dimension in the width direction) of the gaps becomes larger as going toward the outer side in the radial direction. Therefore, in the construction of the present example, in a state in which the engaging element 40 is separated outward in the radial direction from the output side engaging portion 28, movement of the engaging element 40 in the width direction and the rotation direction can be appropriately allowed, and it is possible to effectively prevent an unreasonable force from being applied to the engaging element 40.

(Case where Rotational Torque is Reversely Input to the Output Portion 27 (Second Shaft 23))

Figure 6:
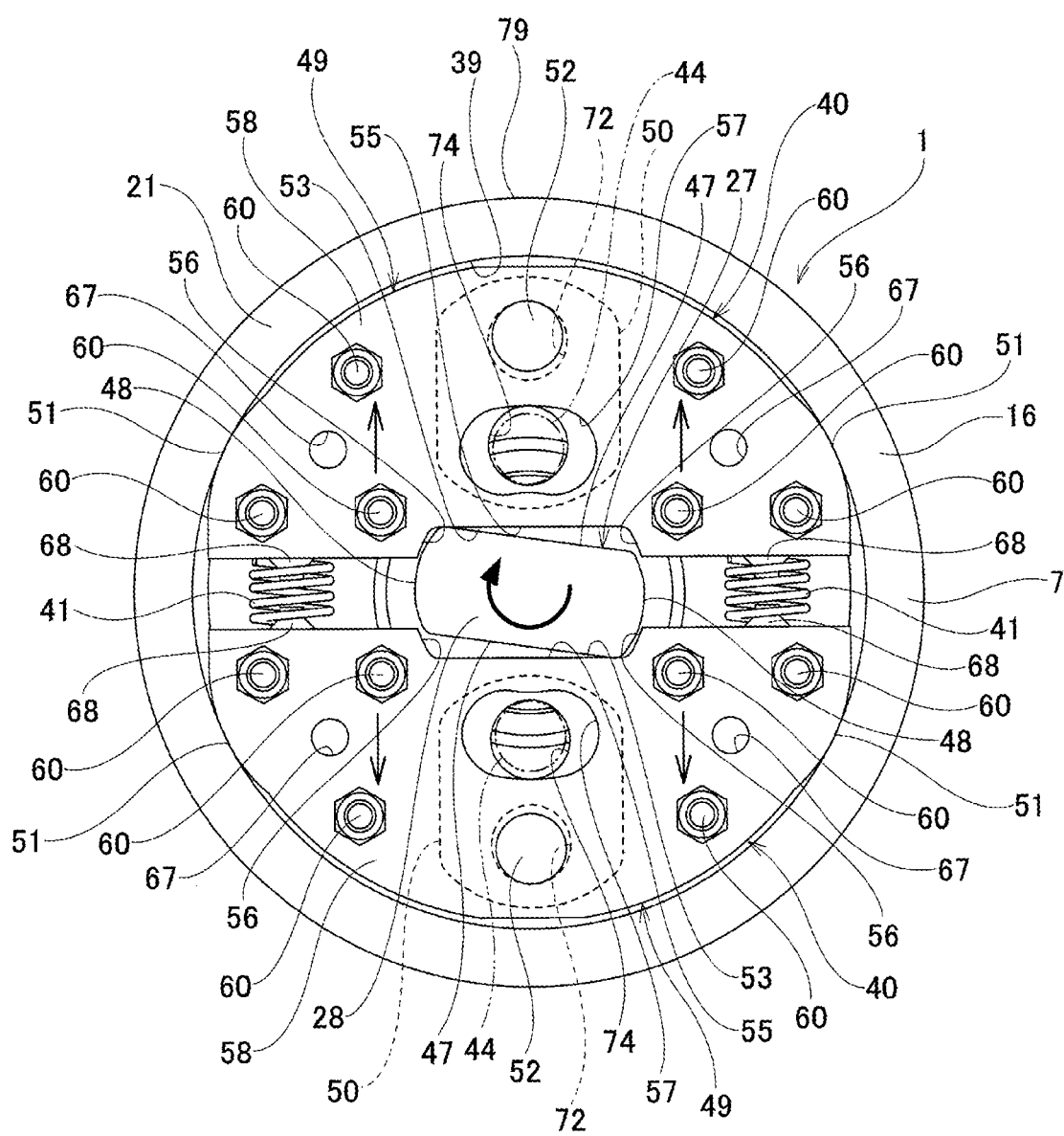
FIG. 6 is a cross-sectional view illustrating the reverse input cutoff clutch of the first example in a state where a rotational torque is reversely input to an output portion thereof.
Figure 7:
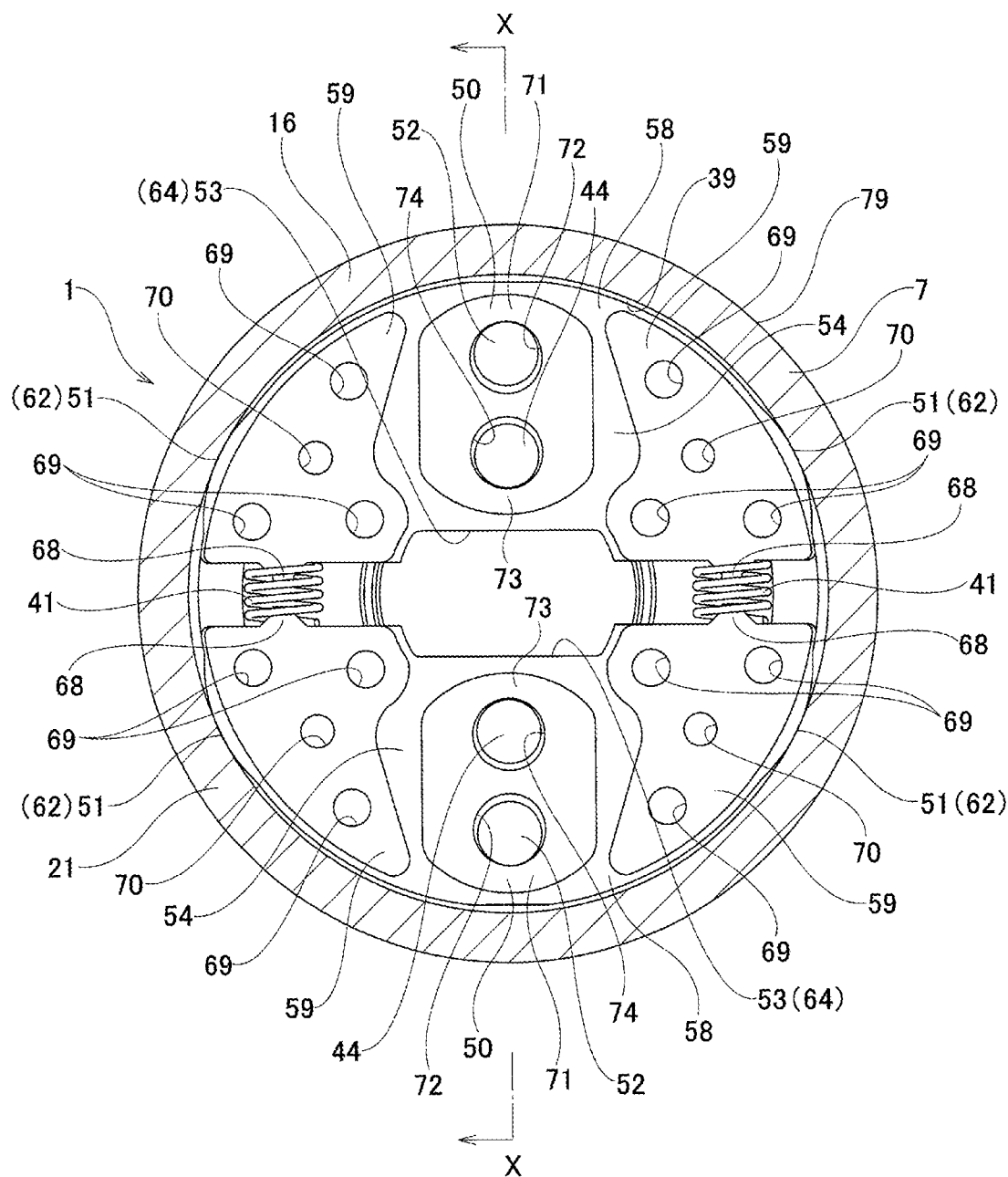
FIG. 7 is a diagram illustrating the reverse input cutoff clutch illustrated in FIG. 4 with the second shaft, the main body plate on one side in an axial direction, and bolts and nuts removed.
Figure 8:
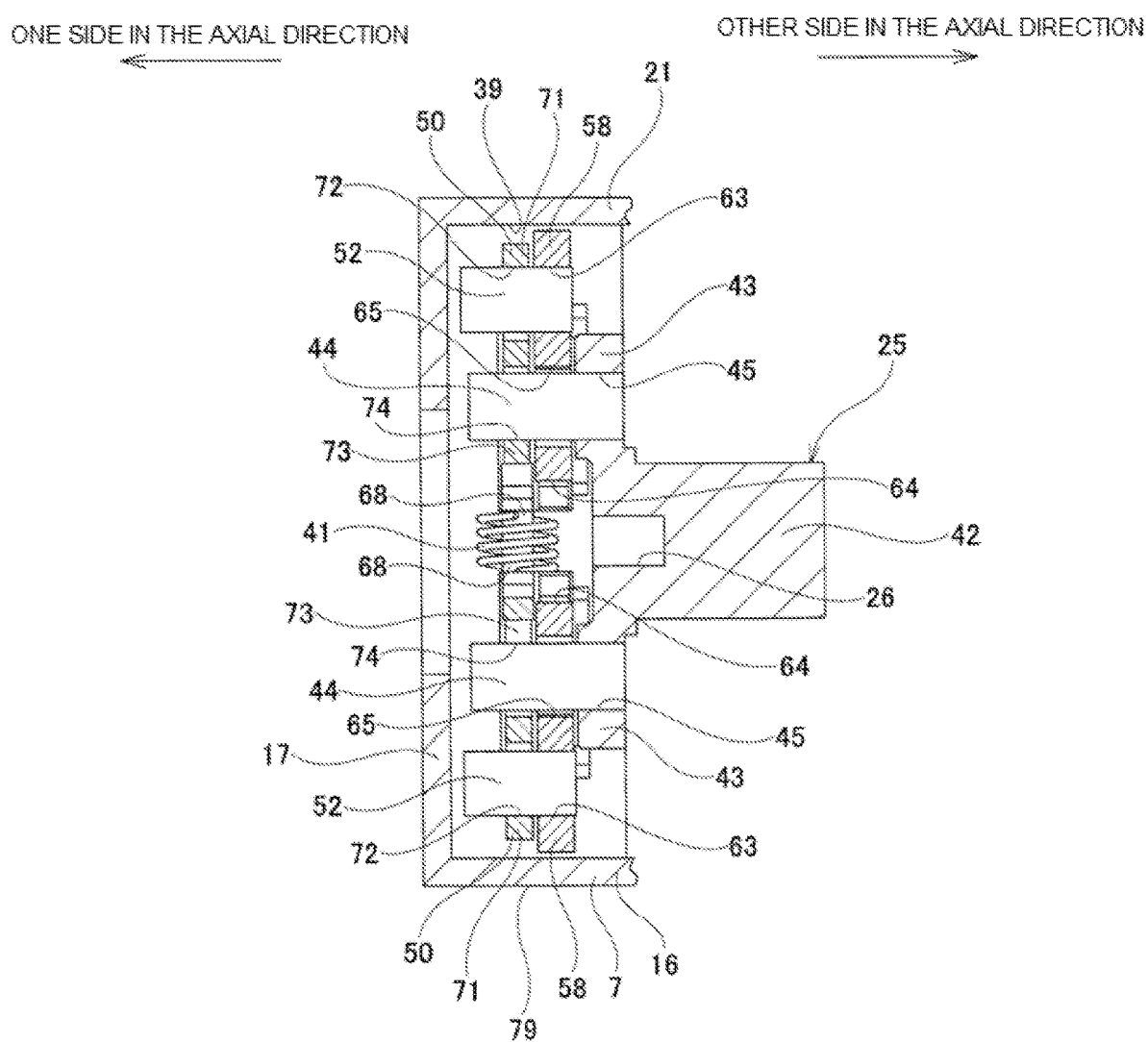
FIG. 8 is a cross-sectional view taken along the section line X-X in FIG. 7.

Next, a case where rotational torque is reversely input to the output portion 27 (second shaft 23) is described. When an external force acts on a gear engaging with the gear portion 30 or a belt passed over the gear portion 30, rotational torque may be reversely input to the second shaft 23 through the gear portion 30. When the rotational torque is reversely input to the second shaft 23, as illustrated in FIG. 6, the output side engaging portion 28 rotates on the inner side of the two output side engaged portions 53 in the rotation direction of the second shaft 23 (clockwise in the example of FIG. 6). In that case, the corner portions that are connection portions between the side surfaces 47 of the output side engaging portion 28 and the guide surfaces 48 press the bottom surfaces 55 of the output side engaged portions 53 outward in the radial direction, and move the two engaging elements 40 in directions approaching the pressed surface 39 (outward in the radial direction). As a result, the pair of pressing surfaces 51 of each engaging element 40 are pressed against the pressed surface 39, and the pressing surfaces 51 frictionally engage with the pressed surface 39. As a result, the rotational torque that is reversely input to the second shaft 23 is transmitted to the motor housing 1 that is fixed to another member and does not rotate and is completely cut off and not transmitted to the first shaft 22, or only a part of the rotational torque that is reversely input to the second shaft 23 is transmitted to the first shaft 22, and the remaining part is cut off.

In order to completely cut off rotational torque that is reversely input to the second shaft 23 and not transmit the rotational torque to the first shaft 22, the two engaging elements 40 are sandwiched between the output side engaging portion 28 and the pressed surface 39 so that the pressing surfaces 51 do not slide (relatively rotate) with respect to the pressed surface 39, and lock the second shaft 23. On the other hand, in order that only a part of the rotational torque reversely input to the second shaft 23 is transmitted to the first shaft 22 and the remaining part is cut off, the two engaging elements 40 are sandwiched between the output side engaging portion 28 and the pressed surface 39 so that the pressing surfaces 51 slide with respect to the pressed surface 39, and semi lock the second shaft 23. When rotational torque is further reversely input to the second shaft 23 in a state in which the second shaft 23 is semi locked, the two engaging elements 40 rotate about the center of rotation of the second shaft 23 due to the engagement between the output side engaging portion 28 and the output side engaged portions 53, while the pressing surfaces 51 are made to slide with respect to the pressed surface 39. When the two engaging elements 40 rotate, the input side engaging portions 44 are pulled by the pivot support shafts 52 through the linking members 50, and a part of the rotational torque is transmitted to the first shaft 22.

In the present example, each of the two engaging elements 40 has pressing surfaces 51 at two locations on the outer side surface in the radial direction of the engaging element main body 49 that are separated in the circumferential direction, and thus when rotational torque is reversely input to the second shaft 23, the frictional engagement force between the pressed surface 39 and the pressing surfaces 51 can be increased due to a wedge effect. However, in a case of embodying the present invention, it is also possible to adopt construction having a pressing surface at only one position in the circumferential direction of the outer side surface in the radial direction of the engaging element main body.

In the electric motor with a reverse input cutoff clutch of the present example, the output shaft 2 is configured by connecting the first shaft 22 and the second shaft 23, which are arranged coaxially with each other, by the reverse input cutoff clutch 20. Therefore, the electric motor with a reverse input cutoff clutch of the present example may be more easily made more compact compared with construction as in the case of the electric actuator described in JP 2007-016878 A in which the input member and output member of the reverse input cutoff clutch are arranged parallel to the output shaft of the electric motor.

Particularly, in the present example, the end portion of the second shaft 23 on the one side in the axial direction located on the opposite side from the first shaft 22 with the gear portion 30 sandwiched in between in the axial direction is rotatably supported by the bearing device 3 so as to be able to rotate with respect to the fixed portion 34 that is configured by a housing or the like separate from the motor housing 1. Therefore, it is easy to keep the dimension in the axial direction of the motor housing 1, which houses the motor drive unit including the rotor 4 and the stator 5 and the reverse input cutoff clutch 20, short.

Figure 20:
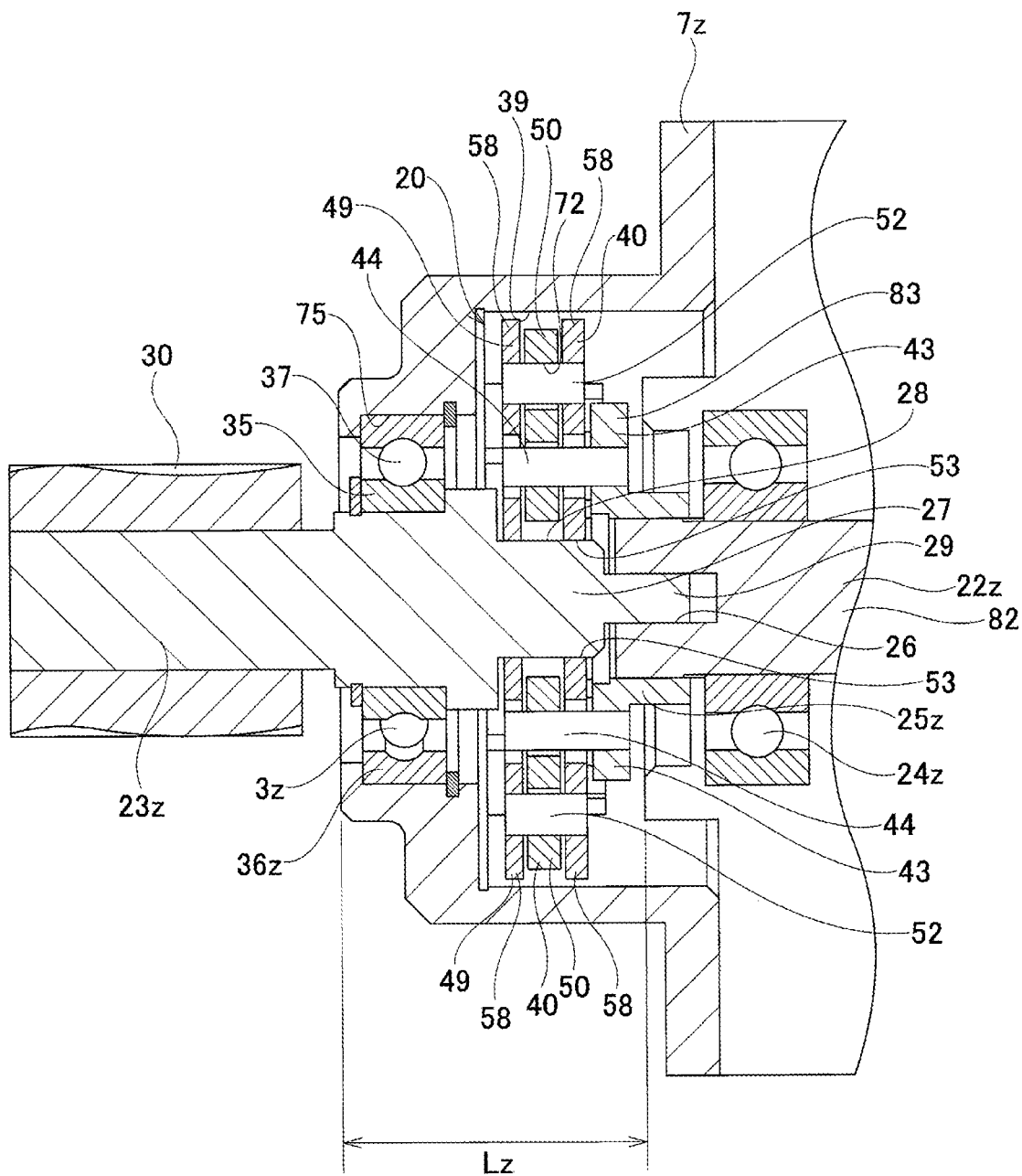
FIG. 20 is a view similar to FIG. 2 and illustrates an electric motor with a reverse input cutoff clutch according to a comparative example of the present invention.
Figure 21:
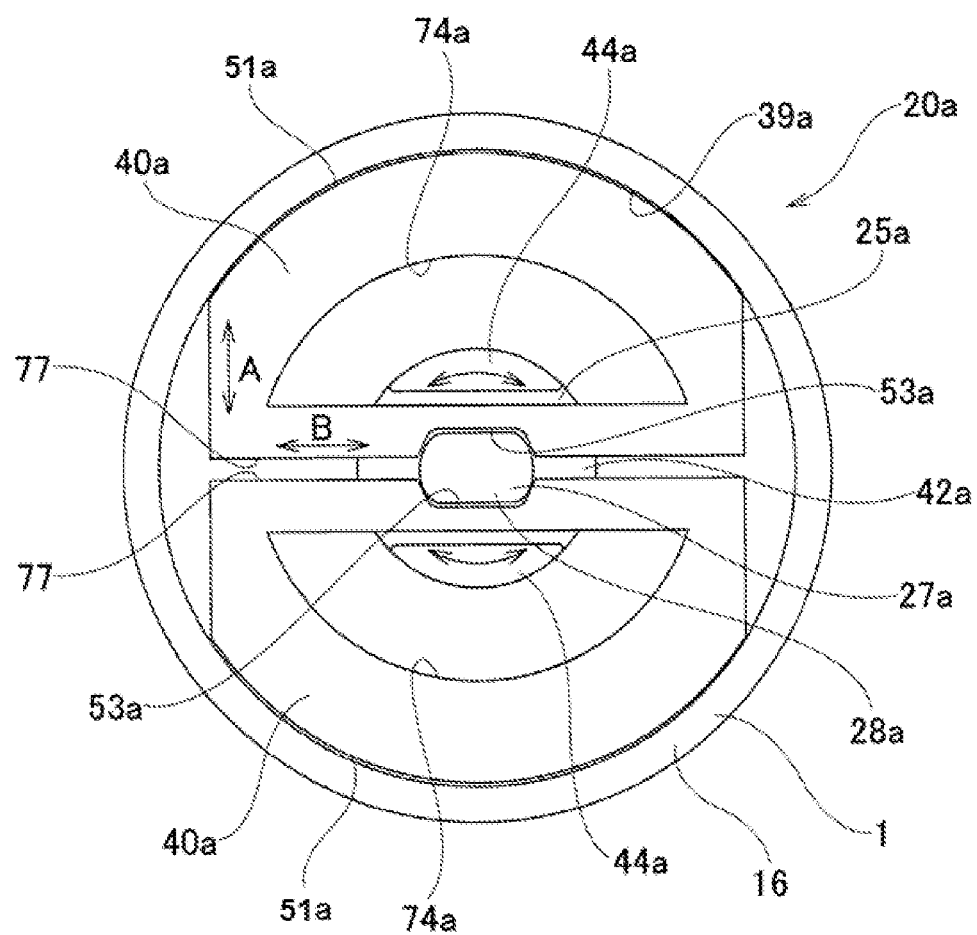
FIG. 21 is a cross-sectional view illustrating a reverse input cutoff clutch of a second example of an embodiment of the present invention.
Figure 22:
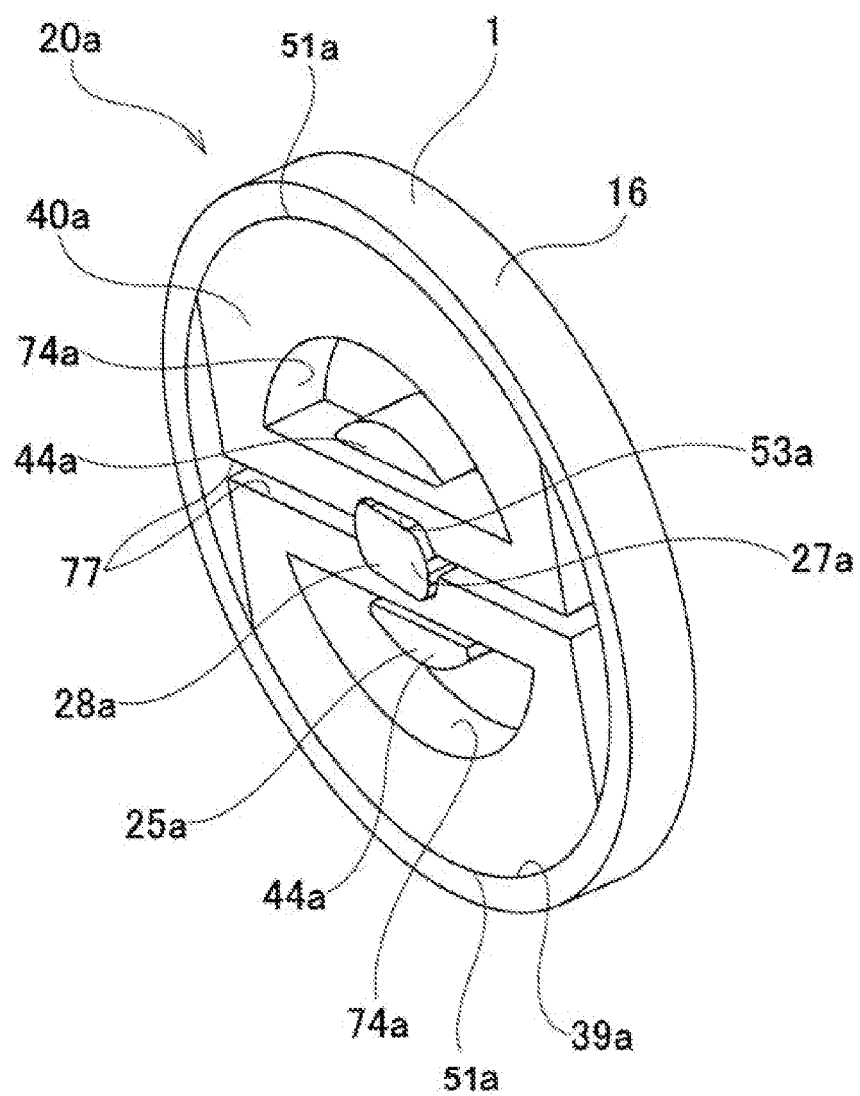
FIG. 22 is a cross-sectional view illustrating the reverse input cutoff clutch of the second example.

That is, as in a comparative example illustrated in FIG. 20, in construction in which an intermediate portion in the axial direction of the second shaft 23z that is nearer to the first shaft 22z than the gear portion 30 in the axial direction is rotatably supported by a motor housing 1z through a bearing device 3z, the amount of protrusion Lz of an end surface on the one side in the axial direction of the second housing element 7z from the end surface on the one side in the axial direction of the first housing element 6 (distance between the end surface face on the one side in the axial direction of the first housing element 6 and the end surface face on the one side in the axial direction of a second housing element 7z) becomes large. In short, in the construction of the comparative example, the protrusion amount Lz is increased by an amount that is necessary for providing a bearing holding portion 75 for internally fitting and holding an outer ring 36z of the bearing device 3z in the second housing element 7z.

On the other hand, in the electric motor with a reverse input cutoff clutch of the present example, it is not necessary to provide a bearing holding portion in the second housing element 7 for internally fitting and supporting the outer ring 36 of the bearing device 3, and thus by that amount, the amount of protrusion L of the end surface of the second housing element 7 on the one side in the axial direction from the end surface of the first housing element 6 on the one side in the axial direction can be suppressed to a small amount, and it is possible to keep the dimension in the axial direction of the motor housing 1 short. From this aspect as well, it is easy to reduce the size of the motor with a reverse input cutoff clutch.

In the present example, the bearing device 3 is configured by a four-point contact type or a deep-groove type single-row radial ball bearing. Particularly, in a case where the bearing device 3 is configured by a four-point contact type single-row radial ball bearing, a load capacity of the bearing device 3 can be increased while suppressing the dimension in the axial direction of the end portion on the one side in the axial direction of the second shaft 23 where the bearing device 3 is externally fitted. Note that in a case of embodying the present invention, the bearing device may also be configured by a double-row radial rolling bearing such as a double-row angular contact ball bearing.

In addition, the electric motor with a reverse input cutoff clutch of the comparative example illustrated in FIG. 20 is configured by assembling the reverse input cutoff clutch 20 in an existing electric motor. Therefore, the first shaft 22z is configured by externally fitting an attachment 83 having the two input arm portions 43 of the input portion 25z to an end portion on the one side in the axial direction of a shaft main body 82 so as to enable torque transmission. In the construction of this kind of comparative example, the length of the end portion on the one side in the axial direction of the first shaft 22z (the portion protruding further to the one side in the axial direction than the portion where the bearing 24z on the one side in the axial direction is externally fitted) becomes longer by an amount that is necessary to maintain a certain amount of fitting length between the shaft main body 82 and the attachment 83.

On the other hand, in the present example, the first shaft 22 is integrally configured by the input portion 25 of the reverse input cutoff clutch 20 and a portion where the rotor 4 is externally fitted and fixed, and thus it is possible to keep the length of the one end in the axial direction of the first shaft 22 short. From this aspect as well, it is easy to reduce the size of the electric motor with a reverse input cutoff clutch. However, in a case of embodying the present invention, the first shaft can also be configured by coupling a shaft main body to which the rotor is externally fitted and fixed and an attachment having an input arm portion to enable torque transmission.

Furthermore, in the present example, in a state in which the first shaft 22 is rotatably supported on the inner side of the first housing element 6, the two input arm portions 43 and the ridges 13 are superposed in the radial direction. Therefore, it is possible to keep the dimension in the axial direction of the clutch housing portion 21 that houses the reverse input cutoff clutch 20 short. From this aspect as well, it is easy to reduce the size of the electric motor with a reverse input cutoff clutch.

In addition, in the present example, a part of a force applied to the gear portion 30 due to a reaction force applied to the gear portion 30 when torque is output from the gear portion 30 as a torque output portion or a force applied from the outside to the gear engaging with the gear portion 30 or a belt passed over the gear portion 30 is supported by the fixed portion 34 through the second shaft 23 and the bearing device 3. Therefore, the force applied to the two bearings 24a, 24b that rotatably support the first shaft 22, to which the rotor 4 is externally fitted, with respect to the motor housing 1, particularly the force applied to the bearing 24a on the one side in the axial direction, can be suppressed to a small value. Accordingly, the two bearings 24a and 24b, particularly the bearing 24a on the one side in the axial direction, can be made more compact.

In addition, in the present example, the shaft concave portion 26 formed on the end surface on the one side in the axial direction of the first shaft 22 and the shaft convex portion 29 formed on the end surface on the other side in the axial direction of the second shaft 23 are spigot fitted. Therefore, even though the end portion on the one side in the axial direction of the second shaft 23 is rotatably supported with respect to the fixed portion 34 by the bearing device 3 which is a single-row deep-10 groove ball bearing, it is possible to prevent the second shaft 23 from being loose, that is, it is possible to prevent the pivoting movement of the second shaft 23 centered on the end portion on the one side in the axial direction from becoming excessively large. Note that in the present example, the shaft concave portion 26 is formed on the first shaft 22, and the shaft convex portion 29 is formed on the second shaft 23; however, it is also possible to spigot fit a shaft convex portion formed on the first shaft and a shaft concave portion formed on the second shaft. Moreover, as long as the coaxiality between the first shaft and the second shaft can be ensured, the shaft convex portion and the shaft concave portion may be omitted.

Furthermore, with the present example, when rotational torque is input to the first shaft 22, the reverse input cutoff clutch 20 can be smoothly switched from the locked or semi-locked state to the unlocked state. This aspect will be described with reference to FIG. 18A and FIG. 18B.

FIG. 18A(a) and FIG. 18A(b) illustrate the mutual positional relationship between a part of the input portion 25 and a part of the engaging element 40 in the construction of the present example. More specifically, FIG. 18A(a) illustrates the positional relationship in the locked or semi-locked state illustrated in FIG. 6, which is a state in which the input side engaging portion 44 is located at a central portion in the width direction of the engaging element 40 and the linking member 50 is closest to the innermost side in the radial direction. FIG. 18A(b) illustrates the positional relationship when the state transitions from the state illustrated in FIG. 18A(a) to a state in which, due to rotation torque T input to the input portion 25, the input side engaging portion 44 rotates in the rotation direction of the input portion 25 (clockwise direction in the illustrated example), and a translational load F begins to act on the pivot support shaft 52 from the input side engaging portion 44 through the linking member 50.

On the other hand, FIG. 18B(a) and FIG. 18B(b) illustrate the mutual positional relationship between part of an input portion 25z and an engaging element 40z in a construction of a comparative example (construction having a similar configuration as the above-described conventional structure except that the shape of the input side engaging portion 44z of the input portion 25z is cylindrical). More specifically, FIG. 18B(a) illustrates the positional relationship in the locked or semi-locked state, which is a state in which an input side engaging portion 44z is located at a central portion in the width direction of the engaging element 40z. FIG. 18B(b) illustrates the positional relationship when the state transitions from the state illustrated in FIG. 18B(a) to a state in which, due to rotation torque T input to the input portion 25z, the input side engaging portion 44z rotates in the rotation direction of the input portion 25z (clockwise direction in the illustrated example), the input side engaging portion 44z comes in contact with an input side engaged portion 74z of the engaging element 40z, and a translational load Ft based on the rotational torque T begins to act on a contact portion X between the input side engaging portion 44z and the input side engaged portion 74z.

In the construction of the comparative example, as illustrated in FIG. 18B(b), the direction of the translational load Ft, that is, the direction of the load acting on the engaging element 40z from the input portion 25z is greatly inclined with respect to the radial direction of the engaging element 40z (the direction of movement of the engaging element 40z when moving toward or away from the pressed surface) which is the direction in which the engaging element 40z should move when switching from the locked or semi-locked state to the unlocked state.

On the other hand, in the construction of the present example, as illustrated in FIG. 18A(b), the direction of the translational load F, that is, the direction of the load acting on the engaging element 40 from the input portion 25 is substantially parallel to the radial direction of the engaging element 40 (the direction of movement of the engaging element 40 when moving toward or away from the pressed surface 39) which is the direction in which the engaging element 40 should move when switching from the locked or semi-locked state to the unlocked state. In other words, the angle between the direction of the translational load F and the direction in which the engaging element 40 should move is smaller than the angle between the direction of the translational load Ft and the direction in which the engaging element 40z should move in the construction of the comparative example. That is, in the construction of the present example, the rotational torque T input to the input portion 25 can be efficiently converted into a load for moving the engaging element 40 inward in the radial direction. Therefore, with the construction of the present example, it is possible to smoothly switch from the locked or semi-locked state to the unlocked state when the rotational torque is input to the input portion 25 (first shaft 22).

Note that both the size of the gap G existing between the inner side surface in the radial direction of the input side engaging portion 44 and the inner peripheral surface of the input side engaged portion 74 of the linking member 50 (difference Wb−Wa described above) in the state illustrated in FIG. 18A(a) in the construction of the present example, and the size of the gap Gz existing between the inner side surface in the radial direction of the input side engaging portion 44z and the input side engaged portion 74z in the state illustrated in FIG. 18B(a) in the construction of the comparative example, from the aspect of simplifying the assembly of the reverse input cutoff clutch, are preferably as large as possible. However, on the other hand, when rotational torque is input to the input portions 25, 25z, from the aspect of immediately moving the engaging elements 40, 40z inward in the radial direction so as to be able to achieve the unlocked state, the sizes of the gaps G, Gz are preferably as small as possible. Therefore, in the manufacture of the reverse input cutoff clutch, it is necessary to adjust the sizes of the gaps G, Gz to appropriate sizes in consideration of these circumstances.

In the construction of the comparative example, in order to adjust the size of the gap Gz, there are cases in which it is necessary to finish with high precision the portion of the input side engaged portion 74z that comes in contact with the inner side surface in the radial direction of the input side engaging portion 44z, and in such a case, it is expected that the cost would increase. On the other hand, in the construction of the present example, it is possible to adjust the size of the gap G by just managing the distance between the center of the support hole 72 of the linking member 50 and that of the input side engaged portion 74, and since the linking member 50 can be manufactured by inexpensive press working, it is easy to reduce the cost.

In addition, in the present example, by fitting an inner-diameter side spigot fitting surface 79 provided on the outer peripheral surface of the clutch housing portion 21 to an outer-diameter side spigot fitting surface 80 provided on the fixed portion 34, the motor housing 1 can be supported by and fixed to the fixed portion 34 in a state in which the motor housing 1 is positioned with respect to the fixed portion 34. That is, in the present example, the outer diameter of the clutch housing portion 21 is smaller than the outer diameter of the drive unit housing portion 19, and thus it is possible to provide the inner-diameter side spigot fitting surface 79 on the outer peripheral surface of the clutch housing portion 21 for positioning the motor housing 1 with respect to the fixed portion 34. Therefore, the work of attaching the motor housing 1 to the fixed portion 34 can be easily performed.

Note that, in the present example, each of the engaging elements 40 is configured by supporting the linking member 50 between the pair of main body plates 58 of the engaging element main body 49 so as to be able to pivot around the pivot support shaft 52. However, in a case of embodying the present invention, an engaging element may also be configured by supporting a pair of linking members on both sides in the axial direction of one main body plate so as to be able to pivot around a pivot support shaft.

Second Example

FIG. 21 to FIG. 26 illustrate a second example of an embodiment of the present invention. In this example, construction of a reverse input cutoff clutch 20a differs from the reverse input cutoff clutch 20 according to the first example.

The reverse input cutoff clutch 20a includes an input portion 25a, an output portion 27a, a pressed surface 39a, and engaging elements 40a.

Figure 23:
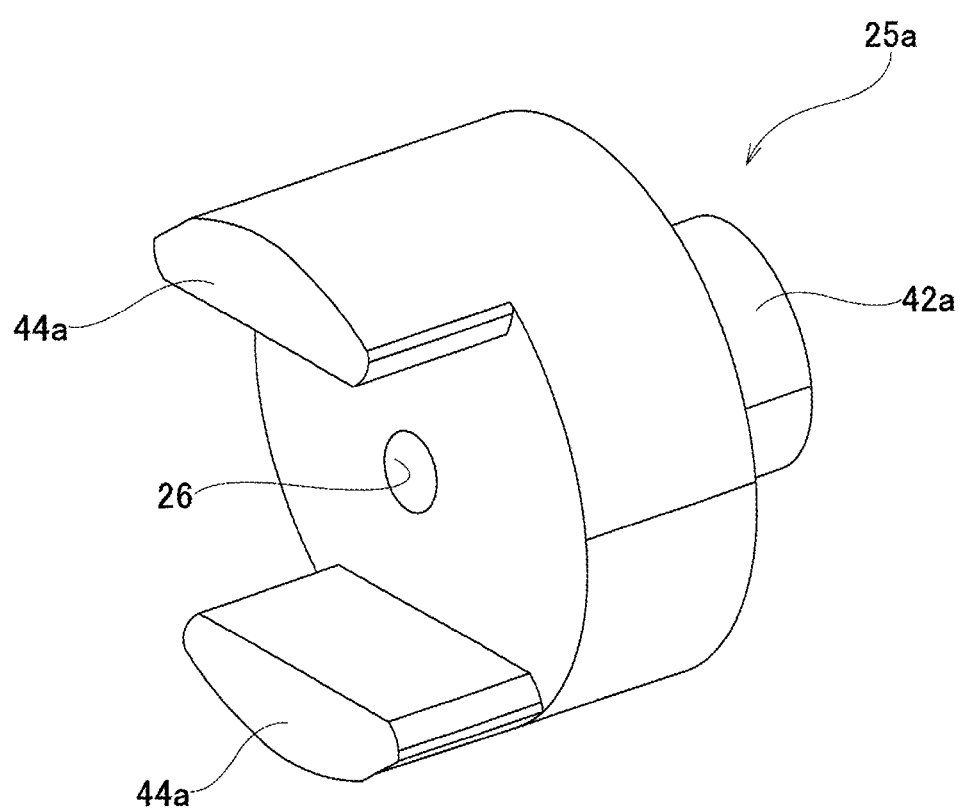
FIG. 23 is a cross-sectional view illustrating an input portion of the reverse input cutoff clutch of the second example.

The input portion 25a is provided on the one side in the axial direction of the first shaft 22 (see FIG. 1). The input portion 25a, as illustrated in FIG. 23, has an input shaft portion 42a and input side engaging portions 44a. The input shaft portion 42a has a stepped cylindrical shape, and is provided at a portion of the first shaft 22 including a portion where a bearing 24a on the one side in the axial direction is externally fitted. In the present example, the input side engaging portions 44a are configured by a pair of input side engaging portions 44a. The input side engaging portions 44a are configured by convex portions extending in the axial direction from two positions on opposite sides in the radial direction of the tip-end surface of the input shaft portion 42a. Note that a shaft concave portion 26 that is recessed in the axial direction from a central portion is provided on an end surface on the one side in the axial direction of the input shaft portion 42a.

Figure 24:
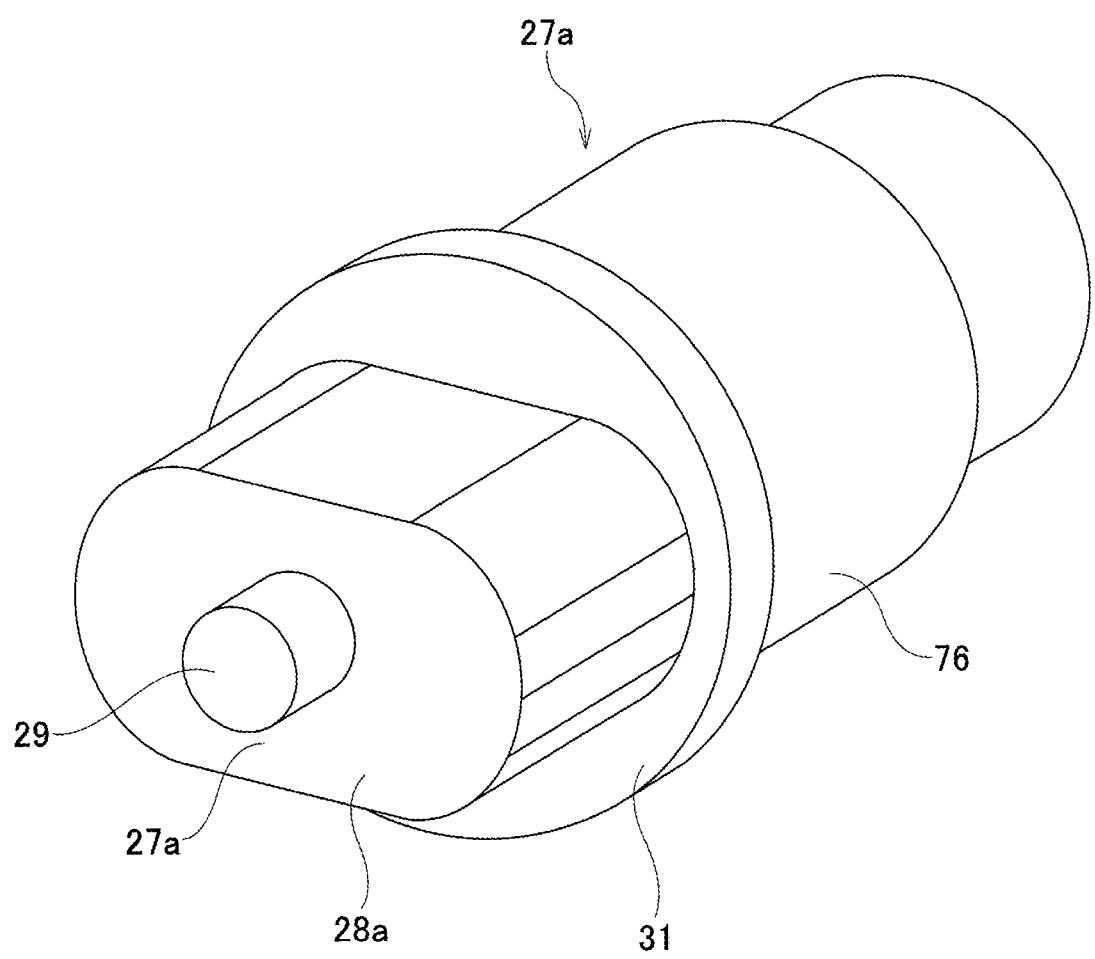
FIG. 24 is a perspective view illustrating an output portion of the reverse input cutoff clutch of the second example.

The output portion 27a is provided on the end portion on the other side in the axial direction of the second shaft 23 (see FIG. 1). As illustrated in FIG. 24, the output portion 27a has an output shaft portion 76, and an output side engaging portion 28a. The output shaft portion 76 has a stepped cylindrical shape and is provided at an end portion on the other side in the axial direction of the second shaft 23. The output side engaging portion 28a has a substantially oval columnar shape and extends in the axial direction from the central portion of the tip-end surface of the output shaft portion 76. The output side engaging portion 28a is arranged in a portion between the two input side engaging portions 44a. Note that the end surface on the other side in the axial direction of the output side engaging portion 28 is provided with a cylindrical shaft convex portion 29 that protrudes in the axial direction from the central portion and fits with an spigot fit with the shaft concave portion 26.

The pressed surface 39 is directly formed on the inner peripheral surface of the motor housing 1 and is configured by a cylindrical concave surface centered on a center of rotation of the output shaft 2.

In the present example, the engaging elements 40a are configured by two engaging elements 40a. The two engaging elements 40a are arranged on an inner side in the radial direction of the pressed surface 39. Each engaging element 40a has a pressing surface 51a that is partially cylindrical convex surfaces on the outer side surface in the radial direction facing the pressed surface 39, and has a bottom surface 77, both side portions in the second direction of which, except for the portion where the output side engaged portion 53a described later is formed, are formed of flat surfaces on the inner side surface in the radial direction such that bottom surfaces 77 of the two engaging elements 40a face each other. Note that the radius of curvature of the pressing surfaces 51a is equal to or less than the radius of curvature of the pressed surface 39.

In a state in which the two engaging elements 40a are arranged on the inner side in the radial direction of the pressed surface 39, the inner diameter dimension of the pressed surface 39 and the radial dimension of the engaging elements 40a are regulated so that there is a gap in at least one of a portion between the pressed surface 39 and the pressing surfaces 51a, and a portion between the bottom surfaces 77.

Each of the engaging elements 40a has an input side engaged portion 74a and an output side engaged portion 53a. The input side engaged portion 74a is configured by a hole that penetrates in the axial direction through an intermediate portion in the radial direction of the engaging element 40a. The input side engaged portion 74a has a size that allows the input side engaging portion 44a to be loosely inserted. Therefore, the input side engaging portion 44a is able to displace in the direction of rotation of the input portion 25a with respect to the input side engaged portion 74a (engaging element 40a), and the input side engaged portion 74a (engaging element 40a) is able to displace in the radial direction of the engaging element 40a with respect to the input side engaging portion 44a. The output side engaged portion 53a is configured by a substantially rectangular concave portion that is recessed outward in the radial direction from the central portion in the width direction of the bottom surface 77 of the engaging element 40a. The output side engaged portion 53a has a size such that the front half portion in the minor-axis direction of the output side engaging portion 28a can be arranged on the inner side thereof.

The reverse input cutoff clutch 20a is such that, in the assembled state, the two input side engaging portions 44a of the input portion 25a are inserted in the axial direction into the input side engaged portions 74a of the two engaging elements 40a, and the output side engaging portion 28a of the output portion 27a is inserted in the axial direction between the two output side engaged portions 53a. That is, the two engaging elements 40a are arranged so as to sandwich the output side engaging portion 28a from the outer side in the radial direction by the output side engaged portions 53a.

<Description of Operation of Reverse Input Cutoff Clutch 20a>

(Case where Rotational Torque is Input to the Input Portion 25a (First Shaft 22))

Figure 25:
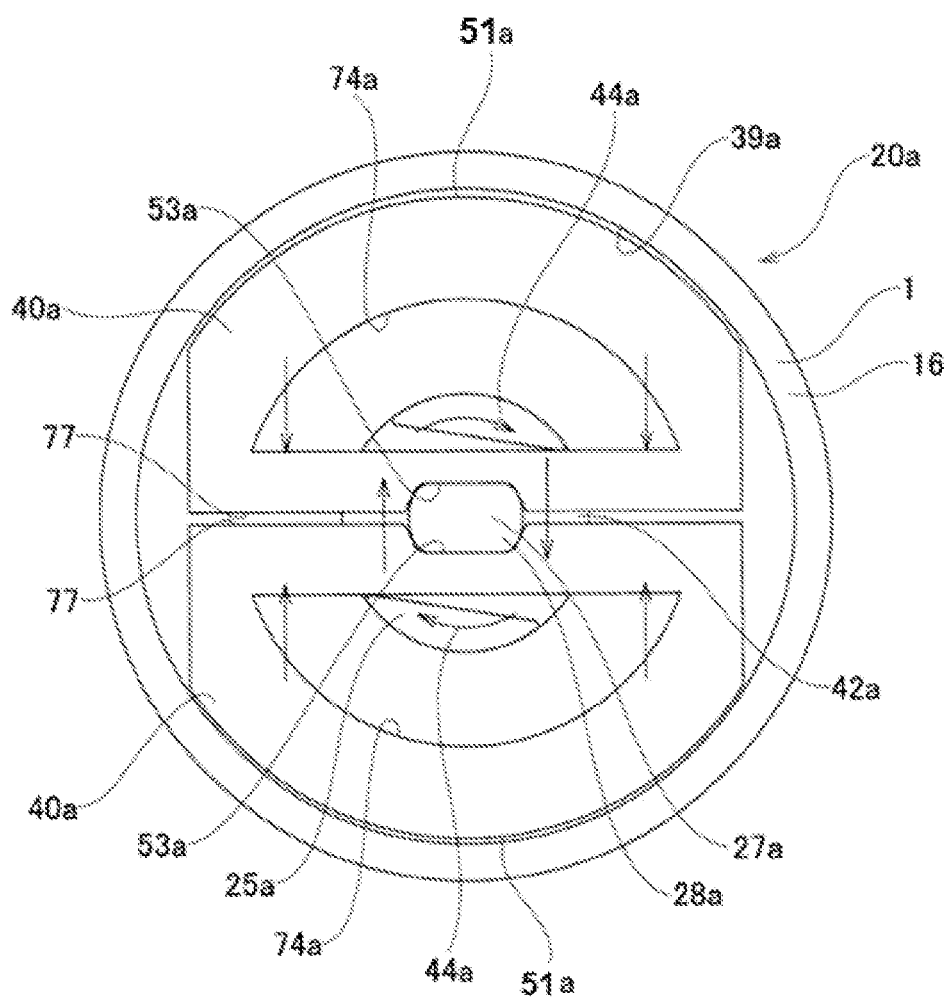
FIG. 25 is a cross-sectional view illustrating the reverse input cutoff clutch of the second example in a state where a rotational torque is input to an input portion thereof.

As illustrated in FIG. 25, when the input unit 25a (first shaft 22) rotates due to electric current flowing to the stator 5 (see FIG. 1), the input side engaging portions 44a rotate on the inner side of the input side engaged portions 74a in the direction of rotation of the input portion 25a (clockwise direction in the example in FIG. 25). Then, the inner side surfaces in the radial direction of the input side engaging portions 44a press the inner surface of the input side engaged portions 74a inward in the radial direction, and move each of the two engaging elements 40a in directions away from the pressed surface 39. As a result, the two output side engaged portions 53a sandwich the output side engaging portion 28a of the output portion 27a from both sides in the radial direction, and the output side engaging portion 28a engages with the two output side engaged portions 53a without looseness. As a result, the rotational torque input to the input portion 25a is transmitted to the output portion 27a through the two engaging elements 40a, and output from the gear portion 30 of the second shaft 23.

(Case where Rotational Torque is Reversely Input to the Output Portion 27a (Second Shaft 23))

Figure 26:
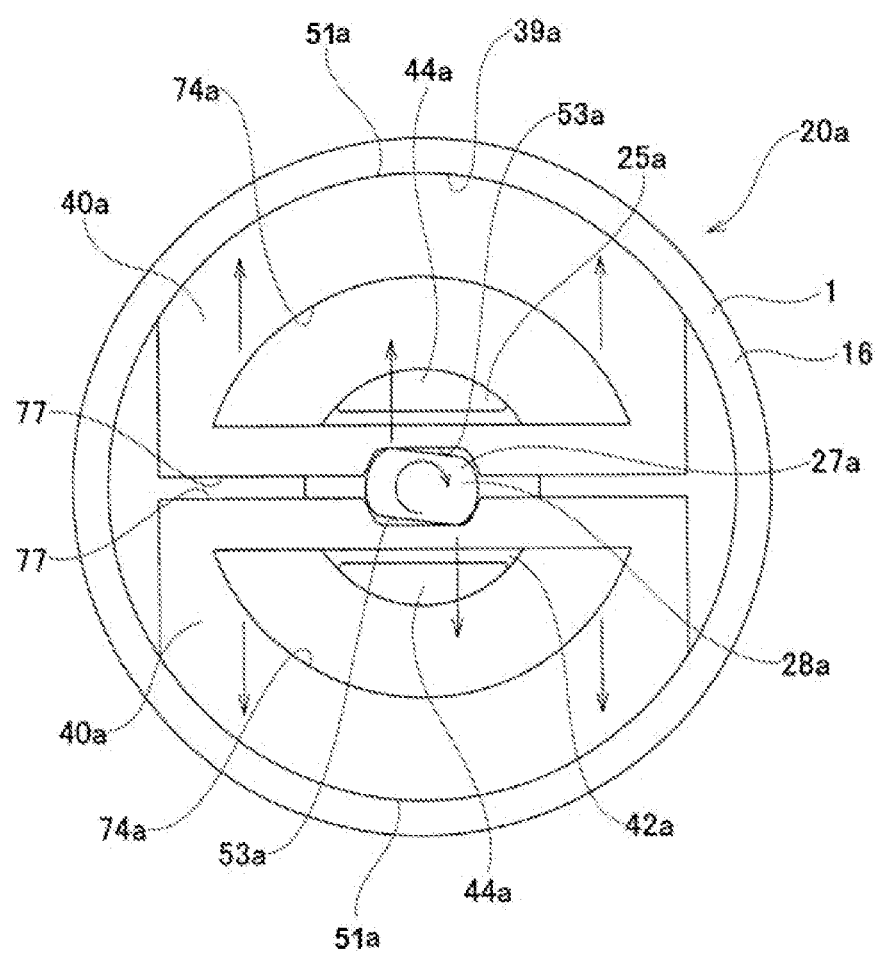
FIG. 26 is a cross-sectional view illustrating the reverse input cutoff clutch of the second example in a state where a rotational torque is reversely input to an output portion thereof.

When rotational torque is reversely input to the output portion 27a (second shaft 23) from the gear portion 30, as illustrated in FIG. 26, the output side engaging portion 28a rotates on the inner side of the pair of output side engaged portions 53a in the direction of rotation of the output portion 27a (clockwise direction in the example in FIG. 26). Then, the corner portions of the output side engaging portion 28a press the bottom surfaces of the output side engaged portions 53a outward in the radial direction, and moves the two engaging elements 40a in directions toward the pressed surface 39. As a result, the pressing surfaces 51a of the two engaging elements 40a are pressed against the pressed surface 39. As a result, the rotational torque reversely input to the output portion 27a is completely cut off by being transmitted to the motor housing 1 and is not transmitted to the input portion 25a, or only part of the rotational torque reversely input to the output portion 27a is transmitted to the input portion 25a and the remaining portion is cut off.

The reverse input cutoff clutch 20a of the present example can be configured more simply than the reverse input cutoff clutch 20 according to the first example, and the cost can be suppressed. Note that in the present example, each engaging element 40a has one pressing surface 51a; however, as in the first example, each engaging element 40a may have pressing surfaces at two positions separated in the circumferential direction. Configuration and operational effects of other parts are the same as those in the first example.

Third Example

Figure 27:
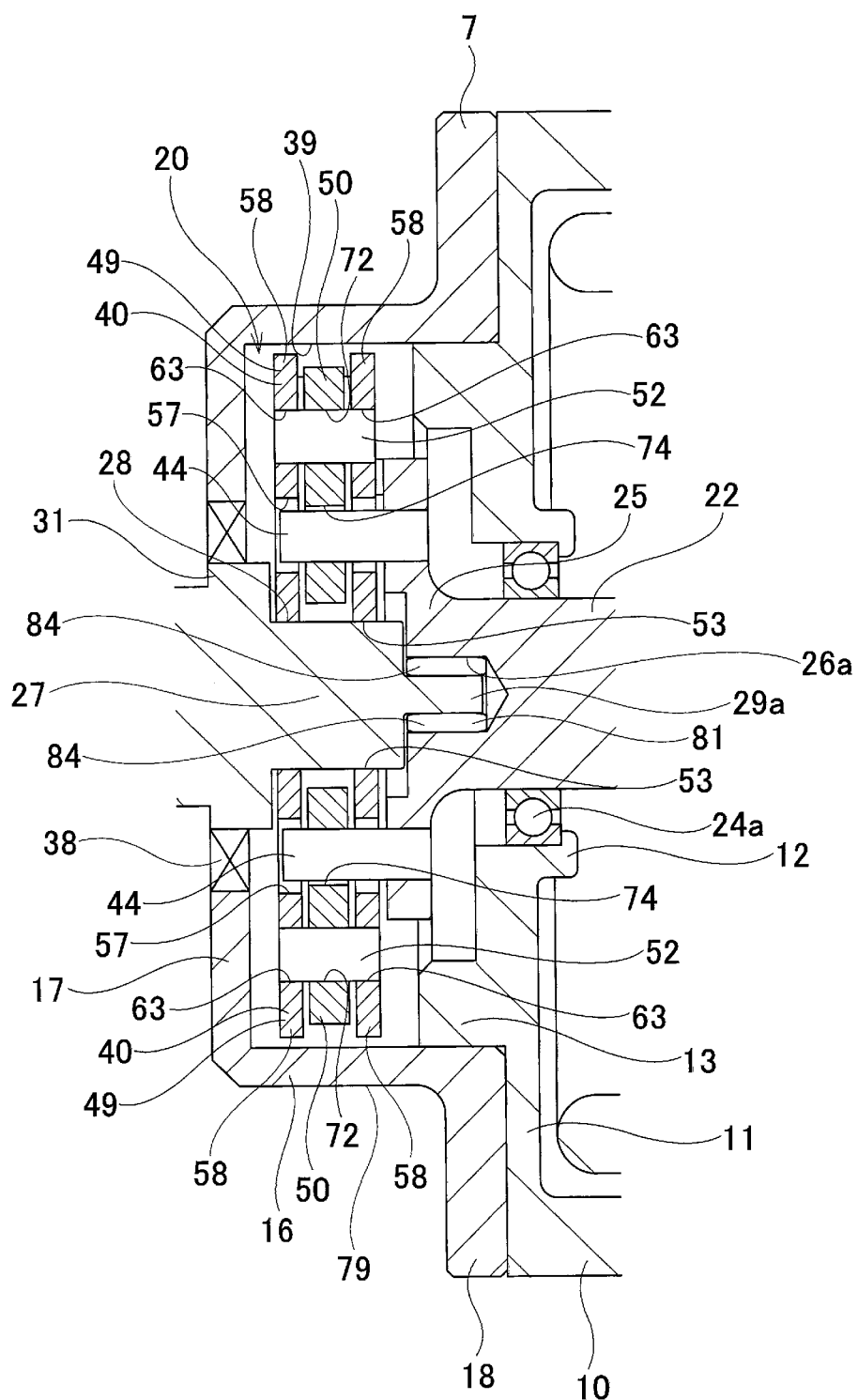
FIG. 27 is an enlarged cross-sectional view illustrating a main part of an electric motor with a reverse input cutoff clutch according to a third example of an embodiment of the present invention.

FIG. 27 illustrates a third example of an embodiment of the present invention. In this example, a first shaft 22a has a cylindrical shaft concave portion 26a in a central portion of an end surface on the one side in the axial direction. In addition, a second shaft 23a has a cylindrical shaft convex portion 29a, having an outer diameter smaller than the inner diameter of the shaft concave portion 26a, at an end portion on the other side in the axial direction. In the present example, the shaft concave portion 29a is inserted into the shaft convex portion 26a and a plurality of rolling bodies 84 is arranged between the inner peripheral surface of the shaft concave portion 26a and the outer peripheral surface of the shaft convex portion 29a, and thus a radial rolling bearing 81 is configured in a portion between the inner peripheral surface of the shaft concave portion 26a and the outer peripheral surface of the shaft convex portion 29a. In the illustrated example, needles (rollers) are used as the rolling bodies 84. As a result, the first shaft 22a and the second shaft 23a are coaxially combined so that relative rotation is possible.

Note that instead of the plurality of rolling bodies between the inner peripheral surface of the shaft concave portion and the outer peripheral surface of the shaft convex portion, it is also possible to arrange a cylindrical sliding bearing (bushing). In addition, in the reverse input cutoff clutch 20a of the second example, it is also possible to arrange a radial rolling bearing or a sliding bearing between the inner peripheral surface of the shaft concave portion and the outer peripheral surface of the shaft convex portion. Configuration and operational effects of other parts are the same as those in the first example and second example.

REFERENCE SIGNS LIST

1 Motor housing
2 Output shaft
3, 3z Bearing device
4 Rotor
5 Stator
6 First housing element
7, 7z Second housing element
8 Main body portion
9 Cover portion
10 Cylindrical portion
11 Annular portion
12 Cylindrical holding portion
13 Ridge
14 Bottom plate portion
15 Cylindrical holding portion
16 Cylindrical portion
17 Inner-diameter side annular portion
18 Outer-diameter side annular portion
19 Drive unit housing portion
20, 20a Reverse input cutoff clutch
21 Clutch housing portion
22 First shaft
23, 23z Second shaft
24a, 24b Bearing
25, 25a, 25z Input portion
26 Shaft concave portion
27, 27a Output portion
28, 28a Output side engaging portion 29 Shaft convex portion
30 Gear portion
31 Flange portion
32 Stepped column-shaped member
33 Cylindrical member
34 Fixed portion
35 Inner ring
36, 36z Outer ring
37 Ball
38 Sealing device
39, 39a Pressed surface
40, 40a, 40z Engaging element
41 Urging member
42, 42a Input shaft portion
43 Input arm portion
44, 44a, 44z Input side engaging portion
45 Fitting hole
47 Side surface
48 Guide surface
49 Engaging element main body
50 Linking member
51, 51a Pressing surface
52 Pivot support shaft
53, 53a Output side engaged portion
54 Internal space
55 Bottom surface
56 Guided surface
57 Insertion hole
58 Main body plate
59 Intermediate plate
60 Bolt
61 Nut
62 Convex surface
63 Installation hole
64 Concave portion
65 Through hole
66 Through hole
67 Positioning hole
68 Convex portion
69 Through hole
70 Positioning hole
71 First end portion
72 Support hole
73 Second end portion
74, 74a, 74z Input side engaged portion
75 Bearing holding portion
76 Output shaft portion
77 Bottom surface
78 Drive unit
79 Inner-diameter side spigot fitting surface
80 Outer-diameter side spigot fitting surface
81 Radial rolling bearing
82 Shaft main body
83 Attachment
84 Rolling body

The invention claimed is:

1. An electric motor with a reverse input cutoff clutch, comprising:
a motor housing;
an output shaft including a first shaft rotatably supported on an inner side of the motor housing; a second shaft having a torque output portion at an intermediate portion in an axial direction of the second shaft and coaxially arranged with the first shaft; and a reverse input cutoff clutch arranged on the inner side of the motor housing and configured to connect the first shaft and the second shaft;
a bearing device externally fitted to a portion of the second shaft located on an opposite side of the first shaft with the torque output portion sandwiched in the axial direction, and configured to rotatably support the second shaft at a portion that does not rotate even during use;
a rotor arranged around the first shaft and configured to rotate integrally with the first shaft; and
a stator coaxially arranged with the rotor and supported and fixed on the inside of the motor housing;
the reverse input cutoff clutch having a function that, in a case where rotational torque is input to the first shaft, transmits the rotational torque that is input to the first shaft to the second shaft, and in a case where rotational torque is reversely input to the second shaft, completely cuts off the rotational torque that is reversely input to the second shaft, or transmits part of the rotational torque that is reversely input to the second shaft to the first shaft and cuts off the remaining portion,
wherein the reverse input cutoff clutch includes:
a pressed surface;
an input portion that integrally rotates with the first shaft;
an output portion coaxially arranged with the input portion and that integrally rotates with the second shaft; and
an engaging element including a pressing surface configured to press against the pressed surface;
the engaging element, in a case where rotational torque is input to the input portion, due to engagement with the input portion, moves in a direction causing the pressing surface to move away from the pressed surface and engages with the output portion, and in a case where rotational torque is reversely input to the output portion, due to engagement with the output portion, moves in a direction causing the pressing surface to move toward the pressed surface, and causing the pressing surface to frictionally engage with the pressed surface; and
the input portion includes an input side engaging portion at a portion separated in a radial direction from a center of rotation;
the output portion includes an output side engaging portion further on an inner side in the radial direction than the input side engaging portion; and
the engaging element includes an input side engaged portion capable of engaging with the input side engaging portion, and is arranged between the pressed surface and the output side engaging portion; and
the engaging element includes:
an engaging element main body having the pressing surface, an output side engaged portion that engages with the output side engaging portion, and a pivot support portion located closer to the pressing surface than the input side engaged portion in a direction in which the pressing surface moves away from or toward the pressed surface; and
a linking member including the input side engaged portion and a pivotally supported portion that is rotatably supported by the pivot support portion.

2. The electric motor with a reverse input cutoff clutch according to claim 1, wherein the bearing device is configured by a radial rolling bearing.

3. The electric motor with a reverse input cutoff clutch according to claim 1, wherein the engaging element is configured by two engaging elements arranged so as to sandwich the output side engaging portion by bottom surfaces thereof.

4. The electric motor with a reverse input cutoff clutch according to claim 1, wherein
the engaging element main body includes:
a pair of main body plates including a plate side output engaging portion that constitutes the output side engaged portion, arranged overlapping in the axial direction, and coupled to each other; and
a pivot support shaft constituting the pivot support portion and having end portions on both sides in the axial direction supported by the pair of main body plates; wherein
the linking member is arranged between the pair of main body plates.

5. The electric motor with a reverse input cutoff clutch according to claim 4, wherein
the engaging element main body comprises an intermediate plate supported between the pair of main body plates.

6. An electric motor with a reverse input cutoff clutch, comprising:
a motor housing;
an output shaft including a first shaft rotatably supported on an inner side of the motor housing; a second shaft having a torque output portion at an intermediate portion in an axial direction of the second shaft and coaxially arranged with the first shaft; and a reverse input cutoff clutch arranged on the inner side of the motor housing and configured to connect the first shaft and the second shaft;
a bearing device externally fitted to a portion of the second shaft located on an opposite side of the first shaft with the torque output portion sandwiched in the axial direction, and configured to rotatably support the second shaft at a portion that does not rotate even during use;
a rotor arranged around the first shaft and configured to rotate integrally with the first shaft; and
a stator coaxially arranged with the rotor and supported and fixed on the inside of the motor housing;
the reverse input cutoff clutch having a function that, in a case where rotational torque is input to the first shaft, transmits the rotational torque that is input to the first shaft to the second shaft, and in a case where rotational torque is reversely input to the second shaft, completely cuts off the rotational torque that is reversely input to the second shaft, or transmits part of the rotational torque that is reversely input to the second shaft to the first shaft and cuts off the remaining portion,
wherein the reverse input cutoff clutch includes:
a pressed surface;
an input portion that integrally rotates with the first shaft;
an output portion coaxially arranged with the input portion and that integrally rotates with the second shaft; and
an engaging element including a pressing surface configured to press against the pressed surface;
the engaging element, in a case where rotational torque is input to the input portion, due to engagement with the input portion, moves in a direction causing the pressing surface to move away from the pressed surface and engages with the output portion, and in a case where rotational torque is reversely input to the output portion, due to engagement with the output portion, moves in a direction causing the pressing surface to move toward the pressed surface, and causing the pressing surface to frictionally engage with the pressed surface; and
the input portion is integrally formed with the first shaft, and the output portion is integrally formed with the second shaft.

7. An electric motor with a reverse input cutoff clutch, comprising:
a motor housing;
an output shaft including a first shaft rotatably supported on an inner side of the motor housing; a second shaft having a torque output portion at an intermediate portion in an axial direction of the second shaft and coaxially arranged with the first shaft; and a reverse input cutoff clutch arranged on the inner side of the motor housing and configured to connect the first shaft and the second shaft;
a bearing device externally fitted to a portion of the second shaft located on an opposite side of the first shaft with the torque output portion sandwiched in the axial direction, and configured to rotatably support the second shaft at a portion that does not rotate even during use;
a rotor arranged around the first shaft and configured to rotate integrally with the first shaft; and
a stator coaxially arranged with the rotor and supported and fixed on the inside of the motor housing;
the reverse input cutoff clutch having a function that, in a case where rotational torque is input to the first shaft, transmits the rotational torque that is input to the first shaft to the second shaft, and in a case where rotational torque is reversely input to the second shaft, completely cuts off the rotational torque that is reversely input to the second shaft, or transmits part of the rotational torque that is reversely input to the second shaft to the first shaft and cuts off the remaining portion;
wherein the reverse input cutoff clutch includes:
a pressed surface;
an input portion that integrally rotates with the first shaft;
an output portion coaxially arranged with the input portion and that integrally rotates with the second shaft; and
an engaging element including a pressing surface configured to press against the pressed surface;
the engaging element, in a case where rotational torque is input to the input portion, due to engagement with the input portion, moves in a direction causing the pressing surface to move away from the pressed surface and engages with the output portion, and in a case where rotational torque is reversely input to the output portion, due to engagement with the output portion, moves in a direction causing the pressing surface to move toward the pressed surface, and causing the pressing surface to frictionally engage with the pressed surface; and
the motor housing includes the pressed surface on an inner peripheral surface thereof.

8. The electric motor with a reverse input cutoff clutch according to claim 7, wherein
the motor housing comprises a drive unit housing portion that houses the rotor and the stator, and a clutch housing portion that houses the reverse input cutoff clutch and has an outer diameter smaller than an outer diameter of the drive unit housing portion; and the clutch housing portion includes the pressed surface on an inner peripheral surface thereof, and includes an inner-diameter side spigot fitting surface with an outer diameter that does not change in the axial direction on an outer peripheral surface thereof.

9. An electric motor with a reverse input cutoff clutch, comprising:

a motor housing;

an output shaft including a first shaft rotatably supported on an inner side of the motor housing; a second shaft having a torque output portion at an intermediate portion in an axial direction of the second shaft and coaxially arranged with the first shaft; and a reverse input cutoff clutch arranged on the inner side of the motor housing and configured to connect the first shaft and the second shaft;

a bearing device externally fitted to a portion of the second shaft located on an opposite side of the first shaft with the torque output portion sandwiched in the axial direction, and configured to rotatably support the second shaft at a portion that does not rotate even during use;

a rotor arranged around the first shaft and configured to rotate integrally with the first shaft; and a stator coaxially arranged with the rotor and supported and fixed on the inside of the motor housing;

the reverse input cutoff clutch having a function that, in a case where rotational torque is input to the first shaft, transmits the rotational torque that is input to the first shaft to the second shaft, and in a case where rotational torque is reversely input to the second shaft, completely cuts off the rotational torque that is reversely input to the second shaft, or transmits part of the rotational torque that is reversely input to the second shaft to the first shaft and cuts off the remaining portion, wherein one shaft of the first shaft and the second shaft includes a shaft recess portion in a central portion of an end surface in the axial direction, and the other of the first shaft and the second shaft includes a shaft projection portion that is inserted into an inner side of the shaft recess portion; and the output shaft includes a radial bearing arranged between an inner peripheral surface of the shaft recess portion and an outer peripheral surface of the shaft projection portion.

* * * * *